United States Patent
Fujisawa et al.

[11] Patent Number: 5,997,136
[45] Date of Patent: Dec. 7, 1999

[54] INK JET RECORDING METHOD AND APPARATUS THEREFOR

[75] Inventors: Kazutoshi Fujisawa; Michinari Tsukahara; Yoshie Kumagai; Fumie Uehara; Hiroto Nakamura; Hideo Yamazaki, all of Suwa, Japan

[73] Assignee: Seiko Epson Corp, Tokyo-To, Japan

[21] Appl. No.: 08/557,121

[22] PCT Filed: Apr. 12, 1995

[86] PCT No.: PCT/JP95/00717

§ 371 Date: Nov. 26, 1997

§ 102(e) Date: Nov. 26, 1997

[87] PCT Pub. No.: WO95/27620

PCT Pub. Date: Oct. 19, 1995

[30] Foreign Application Priority Data

Apr. 12, 1994 [JP] Japan ................... 6-073545
Apr. 12, 1994 [JP] Japan ................... 6-073546
Apr. 12, 1994 [JP] Japan ................... 6-073547
Apr. 12, 1994 [JP] Japan ................... 6-073548
Apr. 12, 1994 [JP] Japan ................... 6-073549

[51] Int. Cl.$^6$ ............................................. B41J 2/01
[52] U.S. Cl. ...................... 347/101; 347/17; 347/96; 347/102
[58] Field of Search ........................ 347/101, 102, 347/96, 17

[56] References Cited

U.S. PATENT DOCUMENTS 5,468,173  11/1995  Leenders et al. ................... 347/96
5,623,296   4/1997  Fujino et al. ...................... 347/103
5,760,811   6/1998  Seto et al. ........................ 347/131

FOREIGN PATENT DOCUMENTS 0606490   of 0000   European Pat. Off. .
4234660   of 0000   Japan .
62216750  of 0000   Japan .
9461283   of 0000   WIPO .

OTHER PUBLICATIONS

Patent Abstracts of Japan, vol. 012, No. 073 (M674), Mar. 8, 1988.

Patent Abstracts of Japan, vol. 017, No. 002, (M–1348), Jan. 5, 1993.

*Primary Examiner*—John Barlow
*Assistant Examiner*—Christina Annick
*Attorney, Agent, or Firm*—Ladas & Parry

[57] ABSTRACT

An ink jet recording method which can inhibit feathering or bleeding in a print and provide a sharp color image is disclosed. The ink jet recording method according to the present invention comprises the steps of: ejecting a droplet of an ink composition, comprising a colorant, a thermoplastic resin, and water, onto a recording medium to deposit the ink droplet on the recording medium, and heating the recording medium with the ink droplet deposited thereon at the softening temperature of the thermoplastic resin or higher temperature so as to effectively inhibit feathering or bleeding of the ink.

21 Claims, 9 Drawing Sheets

INK JET RECORDING METHOD AND APPARATUS THEREFOR

BACKGROUND OF THE INVENTION

1. Field of the Invention

The present invention relates to an ink jet recording method and more particularly to a "color" ink jet recording method.

2. Background Art

Ink jet recording methods should generally satisfy the following requirements.

1) Realization of a high-quality image free from feathering or bleeding.

2) Rapid drying and fixation of ink composition.

3) High print density.

4) Stable ejection of an ink composition through a nozzle and an ink passage without clogging.

5) High storage stability and safety of an ink composition.

In particular, printing without feathering is more important in color image printing than in monochrome color printing. In the color printing, a plurality of color ink compositions are printed on an identical recording medium. In order to provide a color print free from an uneven color, the boundary of the colors should be clear. Thus, the spread and mixing of ink compositions at the boundary region thereof should be prevented.

The use of an ink composition having a high viscosity may be effective for preventing feathering or bleeding. The ejection and feeding of such an ink composition having a high viscosity, however, may require high energy, resulting in unsatisfactory efficiency.

Various proposals have been made in order to realize printing free from feathering or bleeding. For example, Japanese Patent Laid-Open Publication No.288042/1987 discloses a method in which printing is carried out with heating a recording medium. This publication, however, does not disclose any ink composition containing a thermoplastic resin.

SUMMARY OF THE INVENTION

We have now found that feathering or bleeding of a print can be satisfactorily prevented by depositing an ink composition containing a thermoplastic resin on a recording medium by ink jet recording and then heating the recording medium at a particular temperature or above.

Accordingly, an object of the present invention is to provide an ink jet recording method which can prevent feathering or bleeding of a print.

Another object of the present invention is to provide an ink jet recording method which can develop a sharp color in addition to the prevention of feathering or bleeding.

A further object of the present invention is to provide an ink jet recording apparatus for carrying out the ink jet recording method of the present invention.

According to one aspect of the present invention, there is provided an ink jet recording method comprising the steps of:

ejecting a droplet of an ink composition comprising a colorant, a thermoplastic resin, and water, onto a recording medium to deposit the ink droplet on the recording medium, and heating the recording medium with the ink droplet deposited thereon at the softening temperature of the thermoplastic resin or above so as to effectively inhibit feathering or bleeding of the ink.

According to another aspect of the present invention, there is provide an ink jet recording apparatus comprising:

a recording means for ejecting a droplet of an ink composition comprising water, a thermoplastic resin, a colorant, and a water-soluble organic solvent, onto a recording medium to deposit the ink composition onto the recording medium;

a heating means for heating the recording medium, with the ink droplet deposited thereon, to the softening point of the thermoplastic resin or above; and a carrying means for carrying the recording medium to the recording means and the heating means.

DETAILED DESCRIPTION OF THE INVENTION

Ink Jet Recording Method

The ink jet recording method according to the present invention using an ink composition which is described in detail below will now be described.

A droplet of an ink composition is projected to form an ink image on a recording medium. The formation and ejection of the ink droplet may be carried out by means of an ink jet printing head commonly used in the art. The recording medium may be plain paper including acidic paper and neutralized paper.

According to the method of the present invention, the recording medium with an ink deposited thereon is then heated. Heating is carried out at the softening temperature of the thermoplastic resin or higher temperature. Heating causes the viscosity of the ink composition on the recording medium to be initially lowered. Subsequent evaporation of the solvent results in increased solute concentration and increased viscosity of the ink composition. Finally, the ink is brought to a film which is adhered onto the recording medium. In the method of the present invention, an increase in viscosity can be rapidly attained by virtue of interaction among thermoplastic resin particles present in the ink composition used. Heating of the ink droplet immediately after deposition thereof on a recording medium results in increased viscosity of the ink droplet. Consequently, an ink dot is formed before unnecessary penetration of the ink into the recording medium, i.e., feathering, occurs. Thus, the feathering of an ink on a recording medium can be effectively prevented.

While the softening temperature of the thermoplastic resin or above varies depending upon the thermoplastic resin used, it is generally in the range of from 50 to 120° C., still preferably in the range of from 65 to 90° C. Heating may be initiated after the deposition of an ink droplet. Alternatively, an ink droplet may be deposited on a previously heated recording medium.

Figure 1:
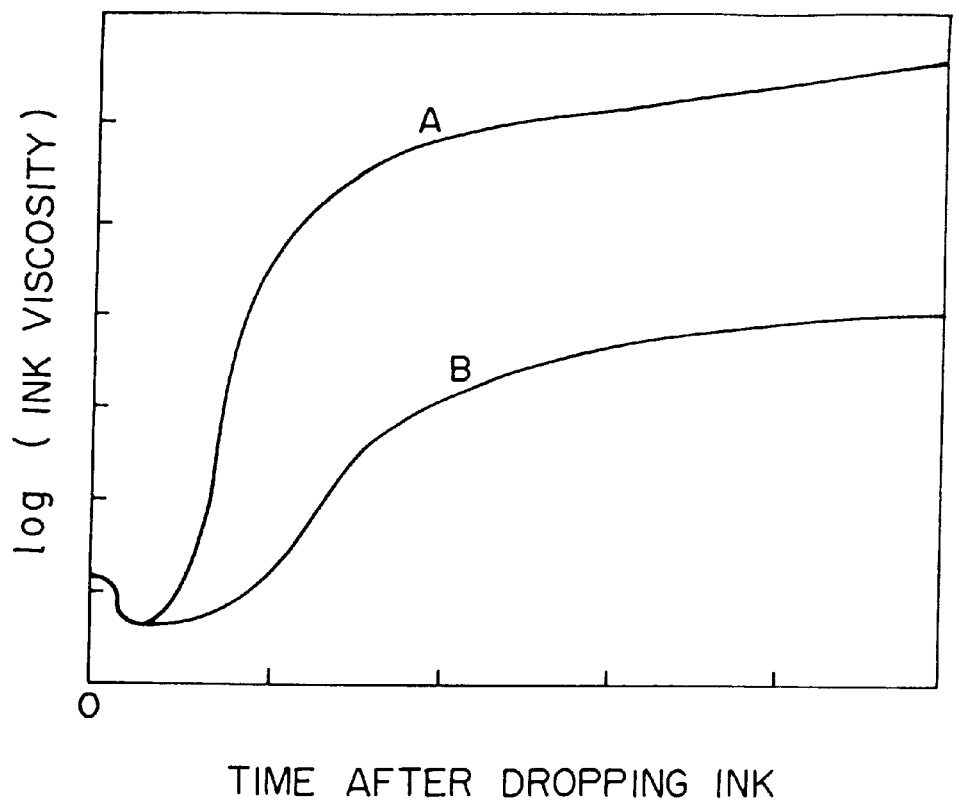
FIG. 1 is a graph showing an increase in viscosity of an ink composition on a recording medium, wherein curve (A) represents a change in viscosity of an ink composition containing a thermoplastic resin and curve (B) represents a change in viscosity of an ink composition not containing a thermoplastic resin.

FIG. 1 is a typical diagram showing a change in viscosity of an ink composition on a recording medium upon heating according to the method of the present invention. Curve A represents an increase in viscosity of an ink composition according to the method of the present invention. As can be seen from curve A, an increase in viscosity can be attained in a short time. On the other hand, curve B represents an increase in viscosity of an ink composition when printing has been carried out in the same manner as the method of the present invention, except that an ink composition which does not contain a thermoplastic resin was used. As can be seen from curve B, an ink composition without a thermoplastic resin exhibits no rapid increase in viscosity.

In the method of the present invention, the ink composition ejected through a nozzle may have a low viscosity. Therefore, printing may be carried out under conventional ink jet recording conditions.

According to a preferred embodiment of the present invention, heating is preferably carried out so as to bring the viscosity of the ink composition to about 1 to 10 Pa.sec or more. According to a preferred embodiment of the present invention, this viscosity value can be attained in a short period of time of about 100 μsec by heating at the softening temperature of the thermoplastic resin or a higher temperature.

That the present invention can prevent ink feathering will be further described.

Figure 2A:
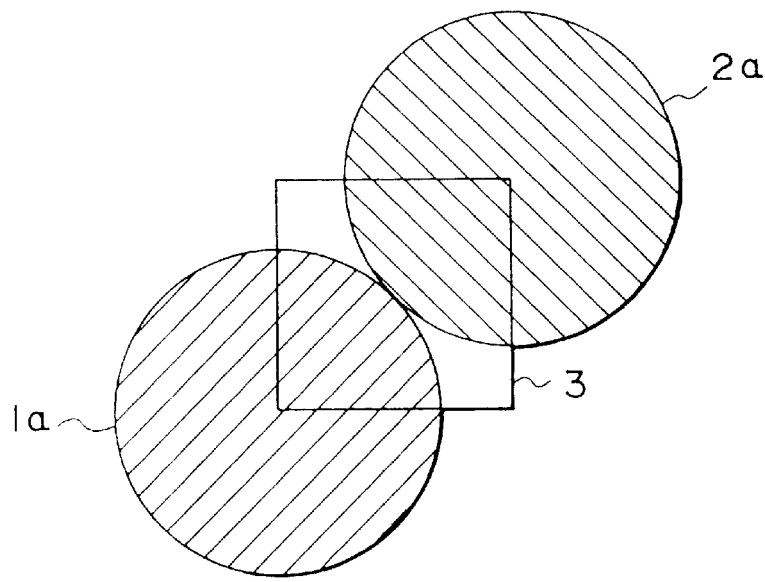
FIG. 2 is a diagram showing the relationship between the size of an ink dot and the pitch of dots, wherein FIG. 2 (A) represents an ideal size of ink dots and FIG. 2 (B) represents a size of ink dots with a position error being taken into consideration.
Figure 2B:
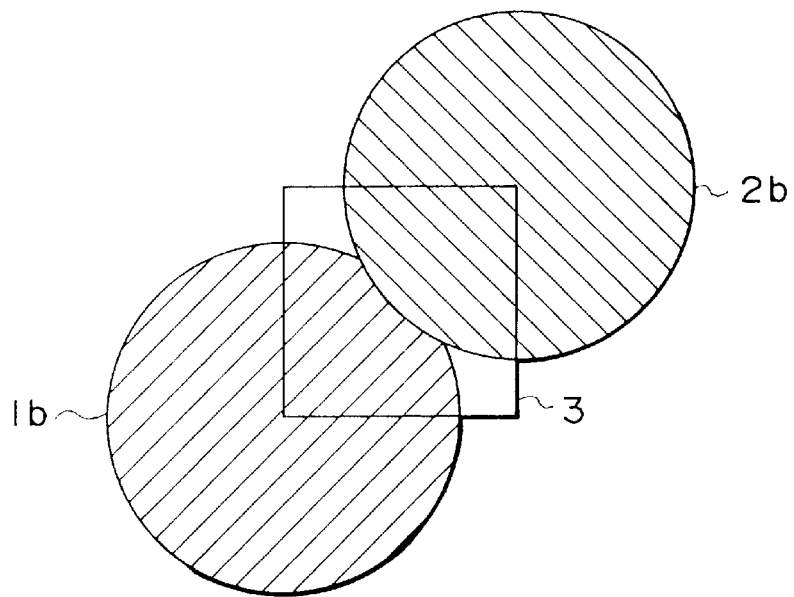

FIG. 2 shows ink dots formed on a recording medium. The size of ink dots in a certain resolution is ideally such that, as shown in FIG. 2 (A), ink dot 1a and ink dot 2a are adjacent to each other. Specifically, the radius of the ink dot is ideally 1/2 of a diagonal line of square 3 formed by connecting the centers of adjacent four dots so as for the centers of the dots to constitute respective apexes of the resultant square. In other words, the radius of an ink dot is ideally a value obtained by the equation: dot pitch x ($\sqrt{2}/2$).

More specifically, when the resolution is 600 dpi, the dot pitch is 1/600 in., i.e., about 42 μm, and a value obtained by multiplying this value by ($\sqrt{2}/2$), i.e., about 30 μm, is an ideal ink dot radius with the ink dot diameter being about 60 μm.

However, in printing of ink dots, a position error often occurs, for example, attributable to a paper feed accuracy. In order to provide a good image despite the position error, it is common practice to form a dot having a radius of about 100 to 150% larger than the ideal size and, according to a preferred embodiment, a radius of about 100 to 120% of the ideal size. As shown in FIG. 1 (B), ink dots are formed in such a size that dot 1b overlaps with dot 2b.

In this case, if the ink composition is further spread in only a certain direction from the ink dot radius thus determined, such a spread is feathering. In this disclosure, the "ink feathering" is a distance of an ink portion extended from an ink dot circle having a radius of dot pitch x ($\sqrt{2}/2$)×100 to 150%.

Figure 3:
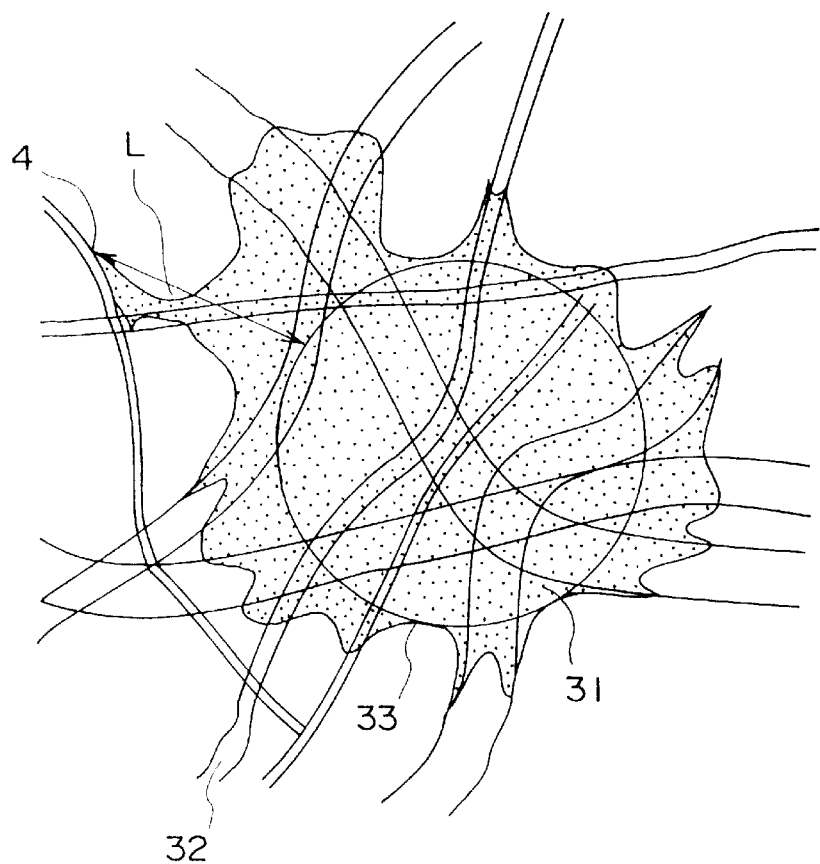
FIG. 3 is a diagram showing the relationship between an ink dot circle in an actual ink dot and ink feathering L.

"Ink feathering" will be defined more specifically with reference to FIG. 3. Ink 31 deposited on a recording medium is penetrated in a gap between fibers 32 of the recording medium to form an ink dot. In some cases, this ink dot is not in a complete circular form. A largest circle 33 inscribed with edges of the dot can be drawn. This circle can be regarded as an ink dot circle, and a distance L is created which is a distance between the ink dot circle and the ink portion 34 most distant from the ink dot circle. This L is causative of feathering. In the present invention, the L is called "ink feathering." According to the method of the present invention, the recording medium is heated so as to minimize the distance L.

According to a preferred embodiment of the present invention, the recording medium with an ink droplet deposited thereon is preferably heated so that the "ink feathering" is not more than about 10% of the radius of an ink dot circle having a size of dot pitch x ($\sqrt{2}/2$)×100 to 150%. Still preferably, heating is carried out so that the ink feathering is not more than about 7% of that.

According to a preferred embodiment of the present invention, the recording medium is heated so that, in an image having a high resolution of not less than 600 dpi, the "ink feathering" is not more than 5 μm. Studies conducted by the present inventors have revealed that when the ink feathering L is brought to not more than 5 μm, dots can be clearly distinguished from one another with the naked eye even in such a high resolution, giving a recognition of a good image quality.

Figure 4A:
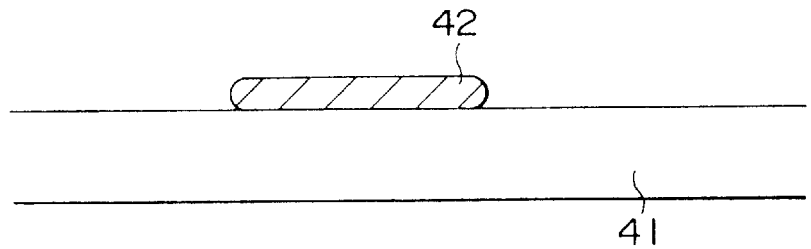
FIG. 4 is a diagram showing the state of an ink dot formed by the ink jet recording method according to the present invention, wherein FIG. 4 (A) is a cross-sectional view of an ink dot on a recording medium formed by the method according to the present invention, FIG. 4 (B) is a plan view of ink dots, adjacent to each other, formed by the ink jet recording method according to the present invention and FIG. 4 (C) is a plan view of ink dots, adjacent to each other, which have been unfavorably deformed.
Figure 4B:
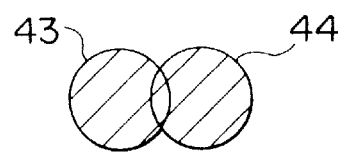
Figure 4C:
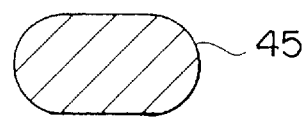

Further, according to the method of the present invention, the ink dot is deposited as a film on a recording medium. This is shown in FIG. 4 (A). An ink dot 42 in a film form is formed on a recording medium 41. In the recording method of the present invention, a colorant stays on the surface of the recording medium, advantageously resulting in an improved printing density.

The method according to the present invention can be advantageously used in the formation of a color image by ejecting ink droplet so as to overlap with each other or to be adjacent to each other. A first ink image is formed on a recording medium and then heated in the step of heating to increase the viscosity of the ink image. After the viscosity is increased to such an extent that new printing on the print causes no bleeding, next printing is carried out. That is, second printing is carried out at a position on or adjacent to the print, using an ink composition which is the same or different from that used for the formation of the first print. The ink composition for the second print basically comprises the same composition as utilized in the formation of the first ink image, i.e., comprises a thermoplastic resin, a colorant, and water. The recording medium with a second print formed thereon is heated so as to inhibit ink feathering. This heating may be also carried out in the same manner as used in the first heating, i.e., at the softening temperature of the thermoplastic resin in the ink composition or a higher temperature.

As a result, for example, regarding adjacent ink dots, as shown in FIG. 4 (B), recording can be carried out so that ink dot 43 and ink dot 44 adjacent to ink dot 43 are not deformed. Further, the flow of the ink compositions into each other does not occur, advantageously resulting in good color development. On the other hand, deformation of both adjacent ink dots brings the ink dots to a shape 45 as shown in FIG. 4 (C), rendering the image unsharp. This is disadvantageous in the reproduction of an image with a high accuracy.

According to a preferred embodiment of the present invention, a good print with dots formed adjacent to each other as shown in FIG. 4 (B) can be formed by simply printing dots at a minimum time interval of 69 μsec. Furthermore, when dots are printed so as to overlap with each other, an image free from bleeding can be provided by simply printing the dots at a minimum time interval of 4 μsec.

Further, it should be noted that the formation of an ink dot in a film form according to the method of the present invention enables the reproduction of a vivid color. The ink dot film is basically formed of a "transparent" resin and a colorant dispersed in the transparent layer. Thus, the color of the colorant exhibits more vividly in the color reproduction.

Figure 5:
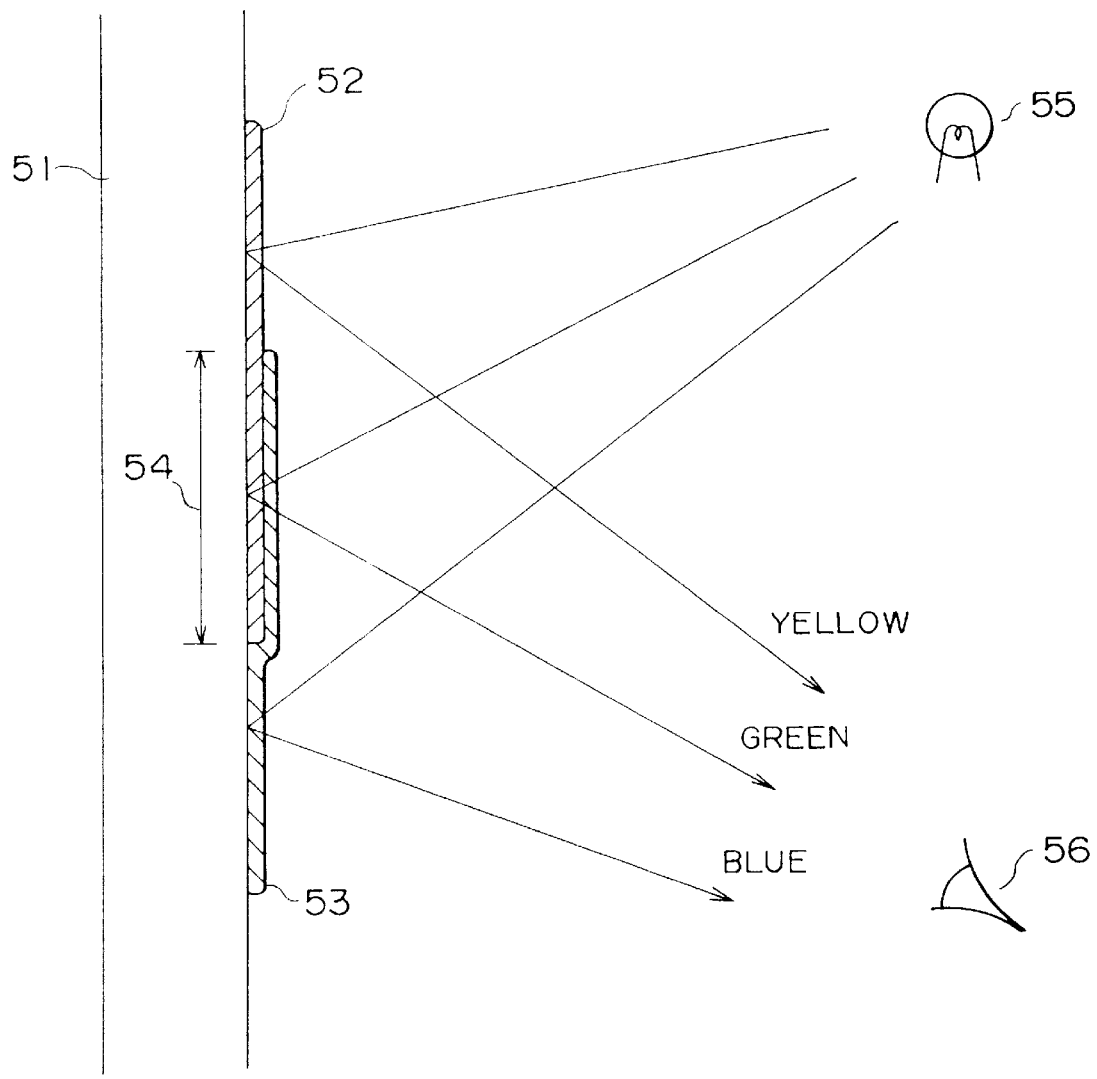
FIG. 5 is a diagram showing color mixing in a color print formed by the ink jet recording method according to the present invention.
Figure 6:
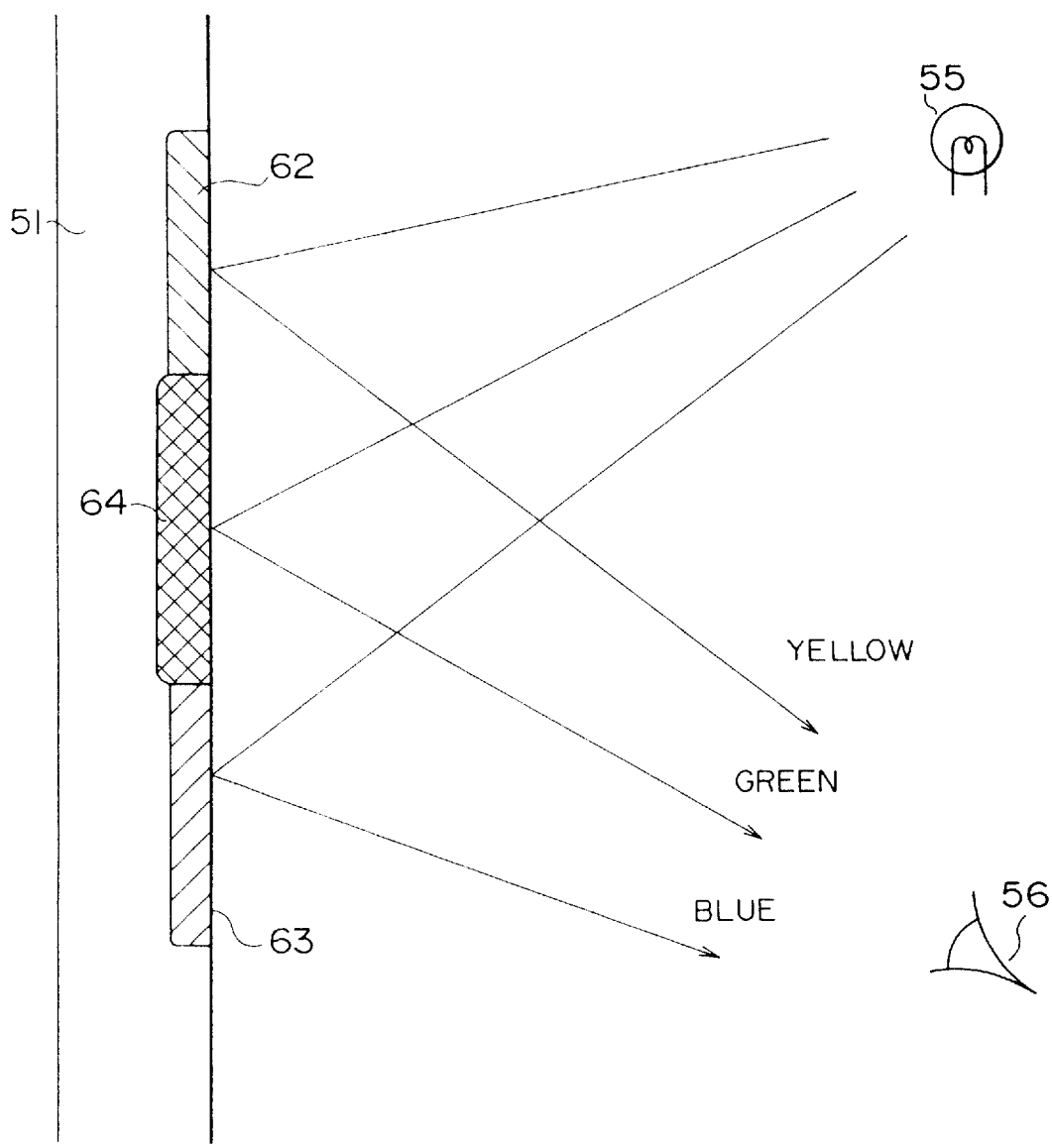
FIG. 6 is a diagram showing color mixing in a color print formed by penetration of ink compositions into a recording medium.

This good color ink reproduction is more advantageous in multi-color printing. FIG. 5 is a diagram showing multi-color printing according to the method of the present invention. In the drawing, a yellow ink print region 52 and a cyan ink print region 53 are formed on a recording medium 51. A region 54 where the two regions overlap with each other constitutes a color mixture region. Light emitted from light source 55 enters each region and reflects on the surface of recording medium 51 or passes through each region to reach a viewer 56. Good color development can be attained by a subtractive color process using yellow region 52 and cyan region 53. Further, in color mixture region 54, vivid green can be developed from yellow and cyan by a subtractive color process. On the other hand, in an embodiment wherein an ink composition is penetrated into a recording medium, a print region as shown in FIG. 6, for example, is formed. Specifically, yellow ink print region 62, cyan ink print region 63, and region 64 formed of a mixture of two colors are formed. In this case, light from light source 55 reflects on the surface of each region to reach viewer 56. Subtraction color by light, in most cases, occurs on the surface of each region. The color development is expected to be inferior to that in the method according to the present invention.

Third printing may be carried out so as to overlap with or adjacent to the second print. The ink composition used in this case is also preferably identical to the ink composition of the first and second prints.

Ink Composition

The ink composition used in the ink jet recording method according to the present invention basically comprises a colorant, a thermoplastic resin, and water.

The term "thermoplastic resin" used herein refers to a thermoplastic resin having a softening or hot-melting temperature of 50 to 150° C., preferably 60 to 100° C. The term "softening or hot-melting temperature" used herein refers to the lowest temperature among the glass transition point, the melting point, the temperature for bringing the coefficient of viscosity to $10^{11}$ to $10^{12}$ P, and the pour point of the thermoplastic resin.

In the heating step of the method of the present invention, a recording medium is heated at the softening temperature of the thermoplastic resin or a high temperature. The softening temperature of the thermoplastic resin refers to the lowest temperature among the the softening point, the glass transition temperature (Tg), the melting point, and, in the case of an emulsion form, the lowest possible film forming temperature (MFT).

The amount of the thermoplastic resin added is preferably about 5 to 40% by weight, still preferably about 5 to 25% by weight based on the whole ink.

Preferably, the resin, when dried under an environment of room temperature, does not form a film but a solid or a fragile solid matter and, when heated at the softening or melting temperature or above and then cooled, forms a strong water-resistant film.

Specific examples of water-insoluble thermoplastic resins include, but not limited to, polyacrylic acid, polymethacrylic acid, polymethacrylic ester, polyethyl acrylic acid, styrene/butadiene copolymer, butadiene copolymer, acrylonitrile/butadiene copolymer, chloroprene copolymer, crosslinked acrylic resin, crosslinked styrene resin, fluororesin, vinylidene fluoride, benzoguanamine resin, phenolic resin, polyolefin resin, cellulose, styrene/acrylic acid copolymer, styrene/methacrylic acid copolymer, polystyrene, styrene/acrylamide copolymer, n-isobutyl acrylate, acrylonitrile, vinyl acetate, acrylamide, silicone resin, polyvinyl acetal, polyamide, rosin resin, polyethylene, polycarbonate, polyvinylidene chloride resin, cellulosic resin, epoxy resin, vinyl acetate resin, ethylene/vinyl acetate copolymer, vinyl acetate/(meth)acrylate copolymer, vinyl chloride resin, polyurethane, and rosin ester.

Specific examples of low-molecular weight thermoplastic resins include polyethylene wax, montan wax, alcohol wax, synthetic oxidized wax, α-olefin/maleic anhydride copolymer, animal and vegetable waxes, such as carnauba wax, lanoline, paraffin wax, and microcrystalline wax.

Preferably, the water-insoluble resin is added to the ink composition in such a form that the resin alone is dispersed as fine particles in an ink, that is, in the form of such a resin emulsion form that the resin is stably dispersed in water. The resin emulsion means the emulsion in which water constitutes a continuous phase and the resin component constitutes a dispersed phase.

The diameter of particles of the resin component is not particularly limited so far as the particles can form an emulsion. It, however, is preferably not more than about 300 nm, still preferably about 50 to 200 nm.

The resin emulsion can be prepared by mixing resin particles optionally together with a surfactant into water. For example, an acrylic resin or styrene/(meth)acrylate resin emulsion can be prepared by mixing either a (meth)acrylic ester or styrene, a (meth)acrylic ester and optionally (meth)acrylic acid and a surfactant into water. The surfactant is not particularly limited, and preferred examples thereof include anionic surfactants. They may be used alone or as a mixture of two or more.

Known resin emulsions may be used as such a resin emulsion. For exmaples, resin emulsions such as described in Japanese Patent publication No. 1426/1987 and Japanese patent Laid-Open Nos. 56573/1991, 79678/1991, 160068/1991, and 18462/1992 as such may be used.

Further, it is also possible to use commercially available resin emulsions, and exmaples thereof include Microgel E-1002 and E-5002 (styrene/(meth)acrylate resin emulsion, manufactured by Nippon Paint Co., Ltd.), Voncoat 4001 (acrylic resin emulsion, manufactured by Dainippon Ink and Chemicals, Inc.), Voncoat 5454 (styrene/(meth)acrylate resin emulsion, manufactured by Dainippon Ink and Chemicals, Inc.), SAE 1014 (styrene/(meth)acrylate resin emulsion, manufactured by Nippon Zeon Co., Ltd.), and Saivinol SK-200 (acrylic resin emulsion, manufactured by Saiden Chemical Industry Co., Ltd.).

In the ink composition used in the present invention, a water-soluble thermoplastic resin may be used. Preferred examples of the water-soluble thermoplastic resin include polyethylene oxide, glue, gelatin, casein, albumin, gum arabic, alginic acid, methyl cellulose, carboxymethyl cellulose, hydroxyethyl cellulose, and polyvinyl ether.

Pigments, water-soluble dyes, disperse dyes, water-insoluble dyes (in the case of addition by kneading with a resin emulsion) are usable as the colorant. Any of the above colorants may be used so far as they have good affinity for water as a main solvent or can be homogeneously dispersed when used in combination with a dispersant or the like.

Pigments usable in the present invention include organic pigments and inorganic pigments. Examples of the pigment for black include carbon blacks (C.I. Pigment Black 7), such as furnace black, lamp black, acetylene black, channel black; metals, such as copper, iron (C.I. Pigment Black 11), or titanium dioxide; and organic pigments such as aniline black (C.I. Pigment Black 1).

Examples of the pigment for color include:

C.I. Pigment Yellow 1 (Fast Yellow G), 3 and 12 (Disazo Yellow AAA), 13, 14, 17, 24, 34, 35, 37, and 42 (yellow iron oxide), 53, 55, 81, and 83 (Disazo Yellow HR), 95, 97, 98, 100, 101, 104, 108, 109, 110, 117, 120, 138, and 153;

C.I. Pigment Orange 5, 13, 16, 17, 36, 43, and 51;

C.I. Pigment Red 1, 2, 3, 5, 17, and 22 (Brilliant Fast Scarlet), 23, 31, 38, and 48:2 (Permanent Red 2B (Ba) ), 48:2 (Permanent Red 2B (Ca) ), 48:3 (Permanent Red 2B (Sr) ), 48:4 (Permanent Red 2B (Mn) ), 49:1, 52:2, 53:1, and 57:1 (Brilliant Carmine 6B), 60:1, 63:1, 63:2, 64:1, and 81 (Rhodamine 6G Lake), 83, 88, and 101 (Red Iron Oxide), 104, 105, 106, and 108 (Cadmium Red), 112, 114, and 122 (Quinacridone Magenta), 123, 146, 149, 166, 168, 170, 172, 177, 178, 179, 185, 190, 193, 209, and 219;

C.I. Pigment Violet 1 (Rhodamine Lake), 3, 5:1, 16, and 19 (Quinacridone Red), 23 and 38;

C.I. Pigment Blue 1, 2, and 15 (Phthalocyanine Blue R), 15:1, 15:2, and 15:3 (Phthalocyanine Blue G), 15:4 and 15:6 (Phthalocyanine Blue E), 16, 17:1, 56, 60, and 63;

C.I. Pigment green 1, 4, 7, 8, 10, 17, 18, and 36; and processed pigments, such as graft carbon prepared by treating the surface of pigments with a resin or the like.

The water-insoluble colorants may be, if necessary, used as a colorant dispersion prepared by dispersing the colorant using a dispersant.

Water-insoluble dyed usable in the ink of the present invention include direct dyes, acid dyes, base dyes, and food dyes, and examples thereof include, but not limited to:

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199;

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247;

C.I. Direct Violet 7, 9, 47, 48, 51, 66, 90, 93, 94, 95, 98, 100, and 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291;

C.I. Acid Black 7, 24, 29, 48, 52:1, and 172;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 261, 396, and 397;

C.I. Acid Violet 5, 34, 43, 47, 48, 90, 103, and 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, and 326;

C.I. Basic Black 8;

C.I. Basic Red 12, 13, 14, 15, 18, 22, 23, 24, 25, 27, 29, 35, 36, 38, 39, 45, and 46;

C.I. Basic Violet 1, 2, 3, 7, 10, 15, 16, 20, 21, 25, 27, 28, 35, 37, 39, 40, and 48;

C.I. Basic Yellow 1, 2, 4, 11, 13, 14, 15, 19, 21, 23, 24, 25, 28, 29, 32, 36, 39, and 40;

C.I. Basic Blue 1, 3, 5, 7, 9, 22, 26, 41, 45, 46, 47, 54, 57, 60, 62, 65, 66, 69, and 71;

C.I. Disperse Yellow 3, 5, 56, 60, 64, and 160;

C.I. Disperse Red 4, 5, 60, 72, 73, and 91;

C.I. Disperse Blue 3, 7, 56, 60, 79, and 198;

C.I. Disperse Orange 13 and 30; and

C.I. Food Black.

Water-insoluble dyes used in a dispersed state or in the form of a mixture thereof or a solution thereof in the resin include, but not limited to:

C.I. Solvent Black 3, 5, and 22;

C.I. Solvent Yellow 19, 44, 98, 104, 105, 112, 113, and 114;

C.I. Solvent Red 8, 24, 71, 109, 152, 155, 176, 177, and 179;

C.I. Solvent Blue 2, 11, 25, 78, 94, and 95;

C.I. Solvent Green 26;

C.I. Solvent Orange 5, 40, 45, 72, 63, 68, and 78; and

C.I. Solvent Violet 13, 31, 32, and 33.

The amount of the dye added may be determined depending upon the kind of the dye, the kind of the solvent component, the properties required of the ink and the like. It is preferably about 0.2 to 10% by weight, still preferably about 0.5 to 5% by weight.

The ink composition used in the present invention may contain an organic solvent in addition to water. Specific preferred examples of the organic solvent include high-volatile monohydric alcohols such as ethanol, propanol, isopropanol, and butanol. It is also possible to use a hydrophilic, high-boiling, low-volatile organic solvent from the viewpoints of preventing nozzle clogging and improving the moisture retention of the ink composition. Specific preferred examples of the hydrophilic, high-boiling, low volatile organic solvent include polyhydric alcohols, such as glycerin, ethylene glycol, diethylene glycol, triethylene glycol, propylene glycol, dipropylene glycol, hexylene glycol, polyethylene glycol, and polypropylene glycol, and monoetherified, dietherified, and esterified products thereof, for example, ethylene glycol monomethyl ether, ethylene glycol monoethyl ether, ethylene glycol monobutyl ether, diethylene glycol monomethyl ether, and diethylene glycol monobutyl ether. Further, nitrogen-containing organic solvents, for example, nitrogen-containing organic solvents, such as N-methyl-2-pyrrolidone, 1,3-dimethyl imidazolidinone, monoethanolamine, N,N-dimethylethanolamine, N,N-diethylethanolamine, diethanolamine, N-n-butyldiethanolamine, triisopropanolamine, and triethanolamine may be as the organic solvent.

According to a preferred embodiment of the present invention, the ink composition used in the present invention further comprises a water-soluble polymer. Regarding the amount of the water-soluble polymer added, the weight ratio of the water-soluble polymer to the thermoplastic resin is 1:10 to 1:1. Specific preferred examples of the water-soluble polymer include polyalkyl oxides, such as polyethylene oxide, polyvinyl pyrrolidone, polyvinyl alcohol, polyvinyl butyral, polyacrylic acid, glue, gelatin, casein, albumin, gum arabic, alginic acid, methyl cellulose, carboxylmethyl cellulose, hydroxy ethyl cellulose, polyvinyl ether, polyvinyl methyl ether, and polyethylene glycol.

According to a preferred embodiment of the present invention, the ink composition used in the present invention may further comprise a saccharide. Regarding the amount of the saccharide added, the weight ratio of the saccharide to the thermoplastic resin in the ink composition is 1:5 to 1:1. Specific preferred examples of the saccharide include monosaccharides, disaccharides, polysaccharides, and glycosides, such as a-cyclodextrin, glucose, xylose, sucrose, maltose, arabinose, maltitol, and starch.

In order to improve various properties, suitable additives may be, if necessary, added to the ink composition used in the present invention. Specific examples of the additive include viscosity modifiers, surface tension modifier, pH adjustors, multitudes, and preservatives. More specifically, at least one member selected from water-soluble anionic, cationic, amphoteric, and nonionic surfactants, which function to regulate the surface tension of the ink and to regulate the diameter of the dot on the recording paper may be added to the ink composition. Further, potassium dihydrogen phosphate, sodium dihydrogen phosphate, and the like may be added to as pH adjustor, and benzoic acid, dichlorophene, hexachlorophene, sorbic acid, p-hydroxybenzoic ester, ethylenediaminetetraacetic acid (EDTA), sodium dehydroacetate, 1,2-benzothiazoline-3-one (trade name: Proxel XL II, manufactured by ICI), 3,4-isothiazoline-3-one and the like may be added for mildewcide, preservative, rust prevention and other purposes. Furthermore, urea, thiourea, ethylene urea and the like may be added from the viewpoint of preventing the nozzle from drying.

According to a preferred embodiment of the present invention, the thermoplastic resin in the ink composition used in the present invention is in the form of a resin emulsion. Further, when the ink composition contains a saccharide, it further contains a nonionic surfactant having a polyoxyethylene group. The addition of the nonionic surfactant can impart better water resistance, rubbing resistance, marker resistance, and water/rubbing resistance to prints.

The amount of the nonionic surfactant added is preferably 0.05 to 10% by weight based on the ink composition. When the nonionic surfactant is present in the ink composition, the weight ratio of the solid content of the resin emulsion to the saccharide in the ink composition is preferably in the range of from 3:1 to 1:1.

According to a preferred embodiment of the present invention, a nonionic surfactant having an HLB (hydro-lipophile balance) value of not less than 13 is preferred as the nonionic surfactant having a polyoxyethylene group.

Preferred examples of the nonionic surfactant having a polyoxyethylene group include acetylene glycol, alcohol ethylene oxide, polyoxyethylene alkyl ether, polyoxyethylene alkylphenyl ether, polyoxyethylene polystilphenyl ether, polyoxyethylene polyoxypropylene glycol, polyoxyethylene polyol propylene alkyl ether, polyoxyethylene polyhydric alcohol fatty acid partial ester, polyoxyethylene fatty acid ester, polyglycerin fatty acid ester, polyoxyethylenated castor oil, polyoxyethylene alkylamine, and polyoxyethylene sorbitan fatty acid ester. Among them, polyoxyethylene polyhydric alcohol fatty acid partial ester and polyoxyethylene sorbitan fatty acid ester are preferred from the viewpoint of improving the light fastness.

Further, according to a preferred embodiment of the present invention, the ink composition used in the present invention contains an anionic surfactant having a polyoxyethylene group when the thermoplastic resin is in the form of a resin emulsion. The addition of an anionic surfactant can impart excellent ink ejection stability and resistance of prints to rubbing and water.

The amount of the anionic surfactant added is preferably in the range of from 0.001 to 0.5 in terms of the weight ratio wherein the solid content of the resin emulsion is presumed to be 1. That is, the weight ratio of the solid content of the resin emulsion to the anionic surfactant in the ink composition is preferably about 1000:1 to 2:1.

Preferred examples of anionic surfactant having a polyoxyethylene group include polyoxyethylene alkyl ether sulfates, polyoxyethylene alkylphenyl ether sulfates, polyoxyethylene styrenated phenyl ether sulfates, polyoxyethylene alkyl ether phosphates, and polyoxyethylene alkyl phenyl ether phosphates. Particularly preferred are polyoxyethylene alkyl ether sulfates and polyoxyethylene alkyl phenyl ether sulfates. Preferred examples of the salt include potassium, sodium, and ammonium salts and a salt with monoethanolamine, particularly a salt with ethanolamine. Among them, an ammonium salt is particularly preferred. Further, according to a preferred embodiment of the present invention, the degree of polymerization of the polyoxyethylene group is preferably about 3 to 10, and the alkyl group preferably has about 1 to 17 carbon atoms.

Furthermore, according to a preferred embodiment of the present invention, the ink composition used in the present invention contains an organic acid when the thermoplastic resin is in the form of a resin emulsion. The addition of the organic acid can impart excellent rubbing resistance and water resistance to prints. The organic acid is preferably an amino acid, its salt, or its derivative, and specific examples thereof include L-ascorbic acid, D-iso-ascorbic acid (erythorbic acid), and glycine. The amount of the organic acid added is preferably about 0.01 to 0.5% by weight based on the ink composition.

Various properties of the ink may be properly regulated. However, according to a preferred embodiment, the viscosity of the ink composition is preferably not more than 50 mPa.sec, still preferably not more than 25 mPa.sec. The ink composition having the viscosity in the above range can be stably projected through a printing head. Further, the surface tension of the ink composition may also be properly determined. In the case of multi-color printing, the surface tension of a color ink composition is preferably 30 to 50 mN/m (25° C.).

Ink Jet Recording Apparatus

The ink jet recording apparatus according to the present invention will now be described with reference to the accompanying drawings.

Figure 7:
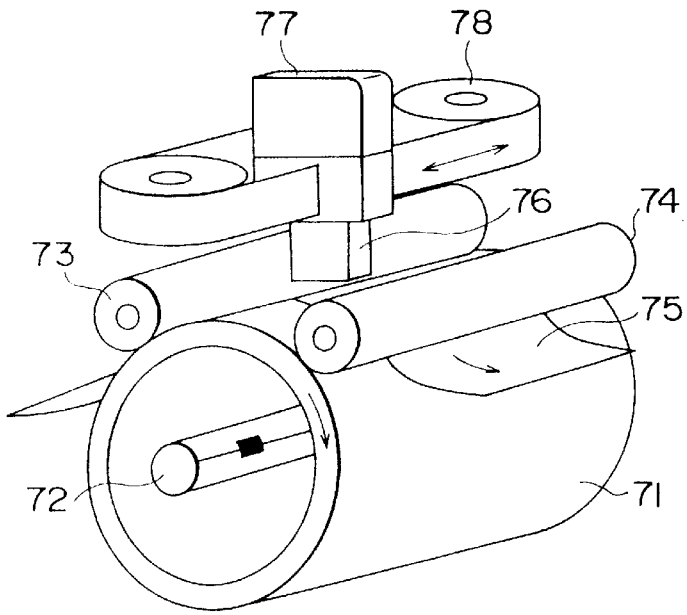
FIG. 7 is a schematic view of the ink jet recording apparatus according to the present invention.

FIG. 7 shows an ink jet recording apparatus according to the present invention. In the drawing, platen 71 serves both as means for heating a recording medium and means for carrying the recording medium. Platen 71 is a cylinder made of a metal having high thermal conductivity, for example, aluminum, and is rotated in a direction indicated by an arrow by a drive (not shown). A silicone rubber or the like may be laminated onto the surface of platen 71. Heater 72 is placed within platen 71 to heat platen 71. Further, paper pressing rollers 73 and 74 are in press contact with platen 71, and recording medium 75 is interposed between platen 71 and paper pressing rollers 73 and 74 the rotation of which carries recording medium 75. Paper pressing roller 73 comprises, for example, a metallic core material and an acrylonitrile rubber bonded to the surface of the core material. Paper pressing roller 74 may comprise, for example, a metallic core material and nylon fibers implanted in the core material. Preferably, the rollers are rotated at a slightly higher speed than platen 71. Ink jet printing head 76 is placed so as to face platen 71 with recording medium 75 sandwiched between ink jet printing head 76 and platen 71. Printing head 76 may either one which forms ink droplets by means of a piezoelectric element or one which forms ink droplets by means of thermal energy. Preferably, printing head 76 may be provided with, for example, 48 nozzles in any matrix form. The nozzles of printing head 76 eject ink droplets based on printing data provided by an arithmetic unit (not shown). An ink composition is fed from ink tank 77 into printing head 76, and printing head 76 can be moved in a direction orthogonal to the direction to which a recording medium is carried by printing head drive 78.

Ink jet recording is carried out as follows. Recording medium 75 is sandwiched between platen 71 and paper pressing rollers 73 and 74 and, in this state, carried. Recording medium 75 being carried comes into contact with platen 71 heated by means of heater 72, whereby recording medium 75 is heated. Therefore, in an apparatus according to this embodiment, the surface of platen 71 is preferably regulated so that the temperature of recording medium 75 is brought to the softening temperature of the thermoplastic resin or above. Then, an ink droplet is selectively ejected onto carried recording medium 75 according to a printing pattern by means of printing head 76. The ink droplet deposited on the recording medium is heated to form a film constituting an ink dot. Subsequently, the recording medium is carried by a predetermined extent by means of platen 71 and paper pressing rollers 73 and 74, and recording is again carried out by means of printing head 76. In this case, when ink dots are formed so as to adjoin each other or to be put on top of each other, it is preferred to carry out printing at certain printing intervals. After necessary printing is carried out on recording medium 75, recording medium 75 is delivered from the apparatus.

Figure 8:
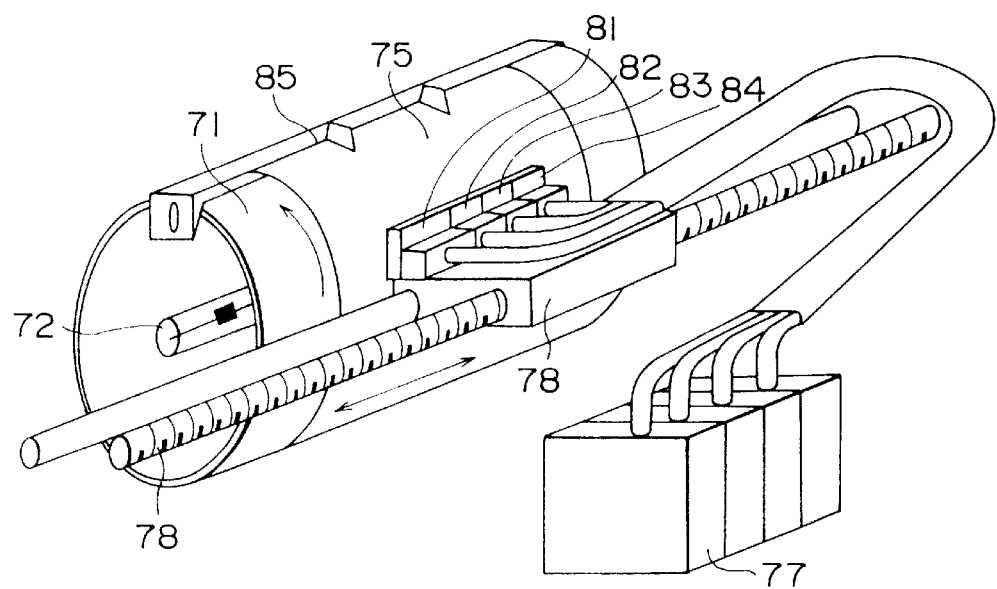
FIG. 8 is a schematic view of an ink jet recording apparatus according to the present invention wherein a plurality of printing heads are provided.

FIG. 8 shows a recording apparatus according to another preferred embodiment of the present invention. In this apparatus, the same elements as those in the apparatus shown in FIG. 7 have the same reference numerals as those in FIG. 7. This apparatus is provided with printing heads separately for respective colors of ink compositions. Specifically, printing heads 81, 82, 83, and 84 respectively project a black ink, a magenta ink, a cyan ink, and a yellow ink. These inks are fed from an ink tank 77 into the printing heads.

Printing with the apparatus shown in FIG. 8 is carried out basically the same manner as described above in connection with printing using the apparatus shown in FIG. 7. Specifically, recording medium 75 is wound around a platen 71 by means of a recording medium winding device 85. Then, printing in a single row or in a plurality of rows by means of printing heads 81 to 84 are carried out. Printing head 78 is then moved to a given extent, and printing is further carried out in a single row or in a plurality of rows. The above procedure is repeated to record an image on recording medium 75.

Ejected ink compositions are color ink compositions, and in order to form a color image, different color ink compositions should be printed so as to adjoin each other or to be put on top of each other. Preferably, such printing is carried out while providing a certain period of time after the preceding printing.

Figure 9:
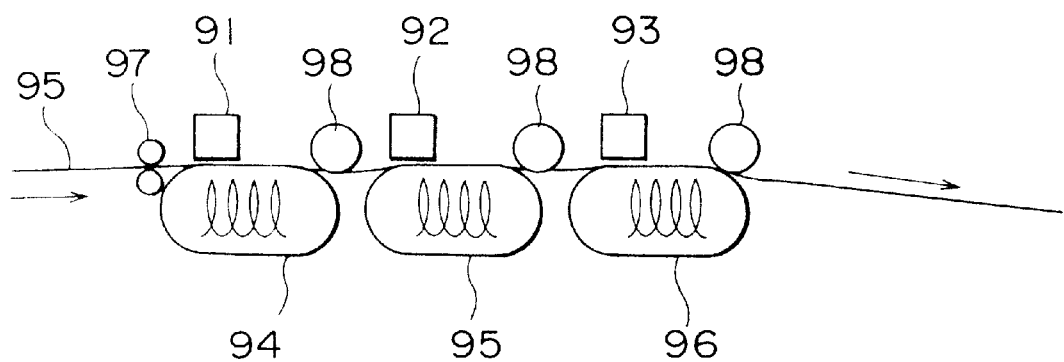
FIG. 9 is a schematic view of an ink jet recording apparatus according to the present invention wherein a plurality of printing heads and a plurality of heating means are provided.

Further, according to a preferred embodiment of the present invention, the ink jet recording apparatus of the present invention may comprise a plurality of printing heads and heating means respectively corresponding to the printing heads. FIG. 9 is a schematic enlarged diagram showing printing heads and heating means of such an apparatus. This apparatus comprises printing heads 91, 92, and 93 and platens 94, 95, and 96, each with a built-in heater, disposed so as to face the respective printing heads 91, 92, and 93. A recording medium is carried by means of recording medium carrying roller 97 and roller 98.

Recording is carried out by simultaneously or successively operating the plurality of printing heads. It should be noted that, when different color ink compositions should be printed so as to adjoin each other or to be put on top of each other, printing is carried out at given intervals with regulating the carrying speed of the recording medium.

Figure 10A:
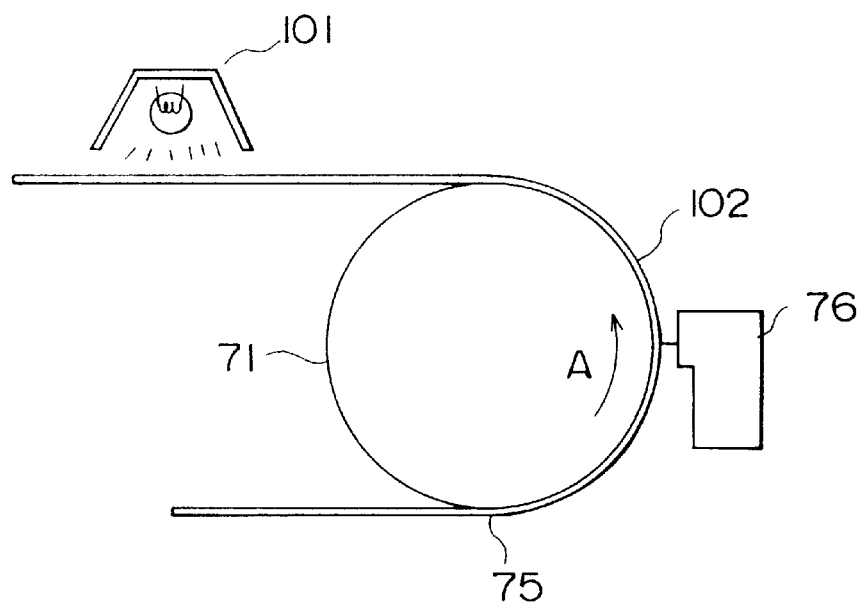
FIG. 10 is a schematic view of an ink jet recording apparatus wherein a recording medium is heated in a non-contact manner, wherein FIG. 10 (A) shows an embodiment wherein a recording medium is heated after printing of an ink composition and FIG. 10 (B) shows an embodiment wherein heating is carried out before an ink composition is printed.
Figure 10B:
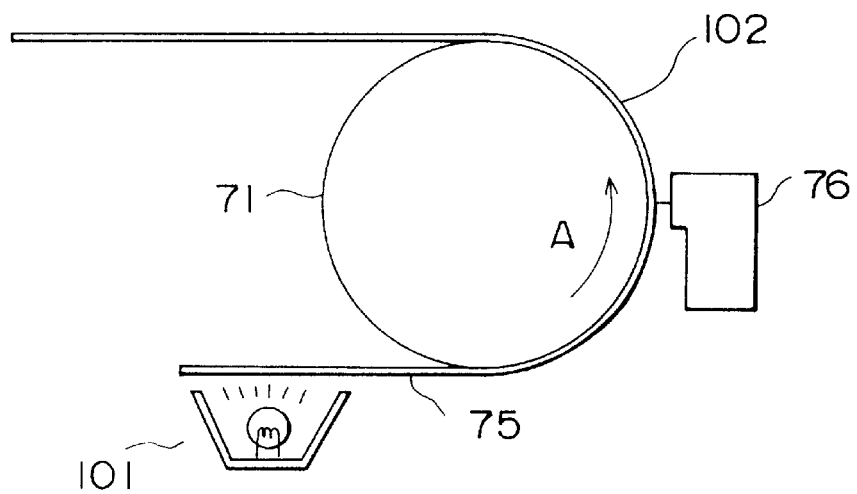

Further, according to another embodiment of the present invention, the recording medium may be heated in a non-contact manner. Specifically, it may be heated by applying a heat radiation to the recording medium or by blowing hot air against the recording medium. FIG. 10 shows an apparatus wherein recording medium 75 is heated by heating means 101 comprising an incandescent lamp and a reflector. FIG. 10 (A) shows an embodiment wherein after ink 102 is deposited onto a recording medium by means of printing head 76, ink 102 is heated by heating means 101. FIG. 10 (B) shows an embodiment wherein ink 102 is deposited by means of printing head 76 onto recording medium 75 previously heated by heating means 101.

In the apparatus according to the present invention, the driving frequency and carriage speed of the printing head may be suitably determined. They, however, are preferably about 3 to 15 kHz and about 100 to 1200 mm/sec, respectively.

EXAMPLES

The present invention will now be described in more detail with reference to the following examples, though it is not limited to these examples only.

In the following exmaples, "%" is by weight unless otherwise specified.

Example A

Ink compositions of Examples A1 to A18 specified in Table 1 were prepared by a conventional method.

TABLE 1

| Ingredient | Example A | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Colorant | | | | | | | | | | | | | | | | | | |
| Carbon black | 1.5 | 1.5 | 1.5 | 1.5 | 1.4 | 1.5 | 1.5 | 1.5 | 1.5 | 1.5 | 1.5 | 1.5 | 1.5 | 1.5 | 1.5 | 1.5 | 1.5 | |
| C.I. Direct Black 154 | | | | | | | | | | | | | | | | | | 1.5 |
| Thermoplastic resin | | | | | | | | | | | | | | | | | | |
| Styrene/acrylic ester copolymer resin emulsion (softening point: 80° C.) | 3 | 5 | 15 | 23 | 40 | 45 | 12 | 12 | 12 | 12 | 12 | 15 | 15 | 15 | 15 | | | |
| Styrene/methacrylic ester copolymer resin emulsion (Tg: 82° C.) | | | | | | | | | | | | | | | | 25 | | |
| Polystyrene emulsion (m.p.: 720° C.) | | | | | | | | | | | | | | | | | 25 | |
| Styrene/acrylic ester copolymer resin emulsion (MFT: 65° C.) | | | | | | | | | | | | | | | | | | 15 |
| Others | | | | | | | | | | | | | | | | | | |
| Polyethylene oxide | | | | | | | 16 | 12 | | | | | | | | | | |
| Sodium alginate | | | | | | | | | 8 | 1.2 | 0.3 | | | | | | | |
| α-Cyclodextrin | | | | | | | | | | | | 2 | 3 | 5 | | | | |
| Maltitol | | | | | | | | | | | | | | | 10 | | | |
| Sucrose | | | | | | | | | | | | | | | | 25 | 30 | |
| Diethylene glycol | 6 | 6 | 6 | 6 | 6 | 6 | 6 | 6 | 6 | 6 | 6 | 6 | 6 | | 6 | 6 | 6 | 6 |
| Proportion of water-soluble polymer and saccharide to thermoplastic resin | 0 | 0 | 0 | 0 | 0 | 0 | 4/3 | 1/1 | 2/3 | 1/10 | 1/15 | 2/15 | 1/5 | 1/3 | 2/3 | 1/1 | 5/5 | 0 |

The quality of prints formed using the ink compositions of Examples A1 to A18 was evaluated as follows.

Evaluation A1

Feathering Length of Single-Color Ink

An ink jet printer having a fundamental construction shown in FIG. 7 was used to carry out printing on XEROX-R paper (recycled paper, manufactured by XEROX Corp.), which had caused relatively large ink feathering, among commercially available typical types of paper.

The length of ink feathering in a dot of the print was evaluated according to the following criteria. Printing was carried out under conditions of a resolution of 300 dpi, an ink ejection frequency of 6 kHz, a carriage travel speed of 1000 mm/sec, and a printing interval between adjacent dots of at least 20 msec.

The heating temperature of the recording medium (platen temperature of the printer) was 120° C. The results were as given in Table 2. In the Table:

⊚⊚: Less than 1 μm (immeasurable)=No feathering occurred,

⊚: 1 to 3 μm=A good image could be formed on a recycled paper even in a high resolution exceeding 600 dpi, ○: 3 to 5 μm=A good image could be formed on a recycled paper in a resolution of 360 to 600 dpi, Δ: 5 to 10 μm=A good image could be formed on a recycled paper in a resolution up to 360 dpi, and x: above 10 μm=An image quality was apparently deteriorated due to ink feathering.

As a control, printing with the ink composition of Example A4 was carried out in the same manner as described above, except that the heating temperature of the recording medium was 60° C. The ink feathering of the print was evaluated according to the above criteria. The results are tabulated as Comparative Example A1 in Table 2.

TABLE 2

| | Example A | | | | | | | | |
|---|---|---|---|---|---|---|---|---|---|
| | 1 | 2 | 3 | 4 | 5 | 6 | 7 | 8 | 9 |
| Results | ○ | ⊚ | ⊚ | ⊚ | ⊚ | ○ | ⊚ | ⊚⊚ | ⊚⊚ |

| | Example A | | | | | | | | | Comparative Example A |
|---|---|---|---|---|---|---|---|---|---|---|
| | 10 | 11 | 12 | 13 | 14 | 15 | 16 | 17 | 18 | 1 |
| Results | ⊚⊚ | ⊚ | ⊚ | ⊚⊚ | ⊚⊚ | ⊚⊚ | ⊚⊚ | ⊚ | ⊚ | Δ |

Evaluation A2

Ink Feathering in Multi-Color Printing

Solid printing (100% duty) of a yellow ink composition of Example A21 was carried out on a recording paper XEROX 4024 (plain paper, manufactured by XEROX Corp.) using an ink jet printer having a fundamental construction shown in FIG. 8, and a cyan ink composition of Example A19 was printed thereon. Printing was carried out under conditions of a resolution of 600 dpi, an ink ejection frequency of 10 kHz, a carriage travel speed of 400 mm/sec, and a printing interval between yellow ink printing and magenta ink printing of 4 sec. The heating temperature of the platen was 150° C.

The feathering length of a magenta ink in the resultant image was 1 to less than 3 μm, and a good color image could be provided even in a resolution exceeding 600 dpi.

On the other hand, printing was carried out in the same manner as described above, except that the heating temperature of the platen was 60° C. or room temperature. The resultant prints were investigated for feathering. As a result, for all the prints, the feathering length exceeded 10 μm, and the images had a poor sharpness.

Evaluation A3
Ink Feathering in Multi-Color Printing

Solid printing (100% duty) of a yellow ink composition of Example A21 was carried out on a recording paper XEROX 4024 (plain paper, manufactured by XEROX Corp.) using an ink jet printer having a fundamental construction shown in FIG. 9, and a cyan ink composition of Example A19 was printed thereon. Printing was carried out under conditions of a resolution of 600 dpi, an ink ejection frequency of 4 kHz, a carriage travel speed of 200 mm/sec, and a printing interval between yellow ink printing and magenta ink printing of 20 sec. The heating temperature of the platen was 150° C.

The length of feathering of a magenta ink in the resultant image was 1 to less than 3 μm, and a good color image could be provided even in a resolution exceeding 600 dpi.

Example B

Ink compositions of Examples B1 to B11, having compositions specified in Table 3, were prepared by a conventional method.

TABLE 4

| | Example B | | | | | |
|---|---|---|---|---|---|---|
| | 1 | 2 | 3 | 4 | 5 | 6 |
| Results | ⊚⊚ | ⊚⊚ | ⊚⊚ | ⊚⊚ | ⊚⊚ | ⊚ |

| | Example B | | | | |
|---|---|---|---|---|---|
| | 7 | 8 | 9 | 10 | 11 |
| Results | ⊚⊚ | ⊚⊚ | ⊚⊚ | ⊚⊚ | ⊚⊚ |

Evaluation B2
Rubbing Resistance

Printing was carried out in the same manner as in Example B1, except that the heating temperature of the platen was 100° C. and 120° C. The resultant prints were evaluated for rubbing resistance as follows. One minute after printing, the prints were rubbed with a finger to observe the state of the prints. As a result, for all the prints heated at 100° C. and 120° C., no smearing was observed.

TABLE 3

| Ingredient | Example B | | | | | | | | | | |
|---|---|---|---|---|---|---|---|---|---|---|---|
| | 1 | 2 | 3 | 4 | 5 | 6 | 7 | 8 | 9 | 10 | 11 |
| Colorant | | | | | | | | | | | |
| Carbon black | 1.5 | 1.5 | 1.5 | 1.5 | 1.5 | 1.6 | 1.5 | | | | |
| C.I. Direct Black 154 | | | | | | | | 1.0 | | | |
| C.I. Pigment Red 122 | | | | | | | | | 1.3 | | |
| C.I. Pigment Blue 15 | | | | | | | | | | 1.3 | |
| C.I. Pigment Yellow 1 | | | | | | | | | | | 1.0 |
| Thermoplastic resin emulsion (solid content) | | | | | | | | | | | |
| Styrene/acrylic ester copolymer | 40 | 30 | 20 | 15 | 10 | 5 | 20 | 30 | | | |
| Styrene/methacrylic ester copolymer | | | | | | | | | 14 | | |
| Acrylic acid/acrylonitorile copolymer | | | | | | | | | | 14 | |
| Alkyl ester of methacrylic acid/acrylic ester copolymer | | | | | | | | | | | 14 |
| Saccharides | | | | | | | | | | | |
| Maltitol | 10 | 10 | | 10 | | 10 | | 10 | 7 | 7 | 7 |
| Xylose | | | 10 | | | | 10 | | | | |
| Surfactant | | | | | 10 | | | | | | |
| Nonionic | | | | | | | | | | | |
| Polyoxyethylene sorbitan monolaurate | 3 | | | 3 | | | | 3 | | | |
| Polyoxyethylene sorbitan monostearate | | 3 | | | | 3 | | | 3 | 3 | |
| Polyoxyethylene octylphenyl ether | | | 3 | | | | 3 | | | | 3 |
| Acetylene glycol alcohol ethylene oxide | | | | | 3 | | | | | | |
| High-boiling, volatile solvent | | | | | | | | | | | |
| Diethylene glycol | 6 | 6 | 6 | | 3 | | | 6 | 3 | 3 | 3 |
| Ethylene glycol | | | | 3 | 3 | | | | | | |
| Glycerin | | | | 3 | | 6 | | | 2 | 2 | 2 |
| Ion-exchanged water | 38.5 | 49.5 | 59.5 | 54.5 | 69.5 | 74.5 | 65.5 | 50 | 69.7 | 69.7 | 70 |
| Ratio of solid content of resin emulsion to saccharide | 4:1 | 3:1 | 2:1 | 1.5:1 | 1:1 | 0.5:1 | 2:1 | 3:1 | 2:1 | 2:1 | 2:1 |

Evaluation B1

Feathering in Print

Printing was carried out in the same manner as in Evaluation A1, except that ink compositions of Examples B1 to 11 were used. Feathering in the prints was evaluated in the same manner as in Example A1. The results were as given in Table 4.

Evaluation B3

Water Resistance

Prints were obtained in the same manner as in Evaluation B2. After they were completely dried, 1 cc of an aqueous alkali having pH 9 was dropped on the prints and the prints were spontaneously dried. Then, water was dropped on the prints. As a result, no blurring was observed for all the prints heated at any temperature.

Evaluation B4
Water and Rubbing Resistance

Prints were obtained in the same manner as in Evaluation B2. Immediately after printing, the prints were rubbed with Bemcot (manufactured by Asahi Chemical Industry Co, Ltd.) wetted with water at a pressure of 0.5 g/mm² to evaluate the water-rubbing resistance of the prints. As a result, rubbing with the Bemcot had no influence on the prints until the Bemcot was moved forward and backward 7 times at the above pressure to cause the surface of the recording paper to be rubbed off.

Evaluation B5
Marker Resistance

Prints were obtained in the same manner as in Evaluation B1. Immediately after printing, the prints were tested as follows. The prints were put on a cross-cut tester and further provided with an aqueous line marker. A load of 300 g was applied to the aqueous line marker, and the prints were rubbed with this loaded line marker. This did not cause any unfavorable phenomenon, such as smearing, for all the prints heated at any temperature.

Evaluation B6

A black ink composition of Example B4 was printed alone in the same manner as in Evaluation B2, except that the resolution, the platen temperature, and the printing frequency were changed to 720 dpi, 120° C., and 7.2 kHz, respectively. The size of the black ink dot was 65 μm.

In addition, solid printing (100% duty) of a yellow ink composition of Example B11 was carried out under the above conditions, and a black ink composition of Example B4 was printed under the same conditions. The size of the black ink dot was 67 μm.

Evaluation B7

Solid printing of a yellow ink composition of Example B11 was carried out in the same manner as in Evaluation B2, except that the resolution, the platen temperature, and the printing frequency were changed to 600 dpi, 100° C., and 5 kHz, respectively. Further, solid printing of a cyan ink composition of Example B10 was carried out so as to come into contact with the yellow print area. Color-to-color bleeding in the interface of two colors was about 1 to 5 μm.

Example C

Ink compositions of Examples C1 to C30, having compositions specified in Table 5, were prepared by a conventional method.

TABLE 5

| Ingredient | Example C | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment | | | | | | | | | | | |
| Carbon black | 1.5 | 1.5 | 1.5 | 1.5 | 1.5 | 1.5 | | 1.5 | 1.5 | 1.5 | 1.5 |
| C.I. Pigment Red 122 | | | | | | | 1.5 | | | | |
| Anionic surfactant | | | | | | | | | | | |
| Polyoxyethylene alkyl ether ammonium sulfate | 3.0 | | | | | | | | | | |
| Polyoxyethylene alkylphenyl ether ammonium sulfate | | 3.0 | | | | | | | | | |
| Polyoxyethylene alkyl ether sodium sulfate | | | 3.0 | | | | | | | 3.0 | |
| Polyoxyethylene alkylphenyl ether sodium sulfate | | | | 3.0 | | | | | | | |
| Polyoxyethylene alkyl ether monoethanolamine sulfate | | | | | 3.0 | | | | | | 3.0 |
| Polyoxyethylene alkyl ether ammonium phosphate | | | | | | 3.0 | | | | | |
| Polyoxyethylene alkyl ether potassium phosphate | | | | | | | | 3.0 | | | 3.0 |
| Polyoxyethylene alkyl ether diethanolamine phosphate | | | | | | | | | 3.0 | | |
| Thermoplastic resin emulsion | | | | | | | | | | | |
| Acrylic-emulsion (Primal-AC-61-manufactured by Rohm & Haas) | 15.0 | 15.0 | | | 15.0 | 15.0 | | | | 15.0 | |
| Styrene acrylic resin emulsion (SG-60; manufactured by Gifu Shellac Manufacturing Co., Ltd. ) | | | 15.0 | | | | 15.0 | | 15.0 | | 15.0 |
| Vinyl acetate resin emulsion (SC-802; manufactured by Sony Chemical Corp.) | | | | 15.0 | | | | 15.0 | | | |
| Saccharides | | | | | | | | | | | |
| Maltose | 10.0 | | | | 10.0 | | | 10.0 | 10.0 | | |
| Ion-exchanged water | 64.5 | 72.5 | 74.5 | 62.5 | 74.5 | 62.5 | 64.5 | 64.5 | 72.5 | 74.5 | 74.5 |
| Glycerin | 6.0 | 6.0 | | 6.0 | 6.0 | | 6.0 | 6.0 | 6.0 | 6.0 | 6.0 |
| Propylene glycol | | | 6.0 | | | 6.0 | | | | | |
| Ethylene urea | | 2.0 | | 2.0 | | 2.0 | | 2.0 | | | |
| Polyoxyethylene anionic surfactant/thermoplastic resin emulsion ratio | 1/5 | 1/5 | 1/5 | 1/5 | 1/5 | 1/5 | 1/5 | 1/5 | 1/5 | 1/5 | 1/5 |

| Ingredient | Example C | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| Pigment | | | | | | | | | | | | |
| Carbon black | 1.5 | 1.5 | 1.5 | 1.5 | 1.5 | 1.5 | 1.5 | 1.5 | 1.5 | 1.5 | 1.5 | 1.5 |
| Anionic surfactant | | | | | | | | | | | | |
| Polyoxyethylene alkyl ether ammonium sulfate | 0.005 | 0.0075 | 0.01 | 0.015 | 0.03 | 0.15 | 0.3 | 0.5 | 1.0 | 7.5 | 10.0 | 15.0 |

TABLE 5-continued

| Thermoplastic resin emulsion | | | | | | | | | | | | |
|---|---|---|---|---|---|---|---|---|---|---|---|---|
| Acrylic emulsion (Primal AC-61; manufactured by Rohm & Haas) | 15.0 | 15.0 | 15.0 | 15.0 | 15.0 | 15.0 | 15.0 | 15.0 | 15.0 | 15.0 | 15.0 | 15.0 |
| Saccharides | | | | | | | | | | | | |
| Maltose | 10.0 | 10.0 | 10.0 | 10.0 | 10.0 | 10.0 | 10.0 | 10.0 | 10.0 | 10.0 | 10.0 | 10.0 |
| Ion-exchanged water | 67.495 | 67.4925 | 67.49 | 67.485 | 69.47 | 67.35 | 67.2 | 67.0 | 66.5 | 60.0 | 57.5 | 52.5 |
| Glycerin | 6.0 | 6.0 | 6.0 | 6.0 | 6.0 | 6.0 | 6.0 | 6.0 | 6.0 | 6.0 | 6.0 | 6.0 |
| Polyoxyethylene anionic surfactant/ thermoplastic resin emulsion ratio | 1/3000 | 1/2000 | 1/1500 | 1/1000 | 1/500 | 1/100 | 1/50 | 1/30 | 1/15 | 1/2 | 2/3 | 1/1 |

| | Example C | | | | | | |
|---|---|---|---|---|---|---|---|
| Ingredient | 24 | 25 | 26 | 27 | 28 | 29 | 30 |
| Pigment | | | | | | | |
| Carbon black | 1.5 | 1.5 | 1.5 | 1.5 | 1.5 | 1.5 | 1.5 |
| Anionic surfactant | | | | | | | |
| Polyoxyethylene alkyl ether ammonium sulfate | 1.5 | | 1.5 | | | | |
| Polyoxyethylene alkylphenyl ether ammonium sulfate | | | | 3.0 | 3.0 | 3.0 | 3.0 |
| Polyoxyethylene alkyl ether sodium sulfate | | 1.5 | | | | | |
| Sodium dioctylsulfossucinate | 1.5 | | | | | | |
| Sodium alkylnaphthalenesulfonate | | 1.5 | | | | | |
| Sodium laurylsulfate | | | 1.5 | | | | |
| Thermoplastic resin emulsion | | | | | | | |
| Styrene acrylic resin emulsion (SG-60; manufactured by Gifu Shellac Manufacturing Co., Ltd. ) | 15.0 | 15.0 | 150 | 14.0 | 11.0 | 9.0 | 7.5 |
| Water-soluble resin | | | | | | | |
| Polyvinyl alcohol: Denka Poval B-24; manufactured by Denki Kagaku Kogyo k.k. | | | | 1.0 | 4.0 | 6.0 | 7.5 |
| Ion-exchanged water | 80.5 | 80.5 | 80.5 | 74.5 | 74.5 | 74.5 | 74.5 |
| Glycerin | | | | 6.0 | 6.0 | 6.0 | 6.0 |
| Polyoxyethylene anionic surfactant/ thermoplastic resin emulsion ratio | 1/10 | 1/10 | 1/10 | 1/4.7 | 3/11 | 1/3 | 1/2.5 |

Evaluation C1
Feathering in Print

Printing was carried out in the same manner as in Evaluation A1, except that ink compositions of Examples C1 to C30 were used. Feathering in the prints was evaluated in the same manner as in Example A1. The results were as given in Table 6.

TABLE 6

| | Example C | | | | | | | | | |
|---|---|---|---|---|---|---|---|---|---|---|
| Results | 1 | 2 | 3 | 4 | 5 | 6 | 7 | 8 | 9 | 10 |
| | ⊚◯ | ⊚ | ◯ | ⊚ | ⊚◯ | ⊚ | ⊚◯◯◯ | ⊚ | ◯ | ⊚ |

| | Example C | | | | | | | | | |
|---|---|---|---|---|---|---|---|---|---|---|
| Results | 11 | 12 | 13 | 14 | 15 | 16 | 17 | 18 | 19 | 20 |
| | ◯ | ⊚◯◯◯ | ⊚◯ | ⊚◯ | ⊚◯◯◯ | ⊚◯◯◯ | ⊚◯ | | | |

| | Example C | | | | | | | | | |
|---|---|---|---|---|---|---|---|---|---|---|
| Results | 21 | 22 | 23 | 24 | 25 | 26 | 27 | 28 | 29 | 30 |
| | ⊚◯ | ⊚◯◯◯ | ◯ | ◯ | ◯ | ◯ | ⊚◯◯◯ | ⊚◯ | | |

Evaluation C2
Rubbing Resistance of Print

Prints were obtained and evaluated for rubbing resistance in the same manner as in Example C1. That is, one min after printing, the prints were rubbed with a finger to investigate smearing in the printed area. The results were as given in Table 7. In the table:

◯: Strong rubbing with a finger resulted in smearing of the print,

Δ: Strong rubbing with a finger resulted in slight smearing of the print, and x: Even light rubbing with a finger resulted in smearing of the print.

Evaluation C3
Water Resistance of Print

Prints were obtained and evaluated for water resistance in the same manner as in Example C1. That is, water droplets were dropped on the prints, and the prints were then observed. The results were as given in Table 7. In the table:

◯: No blurring occurred in the print,

Δ: Blurring occurred in edge of the print, and

X: The print was washed away with water.

The results were as given in Table 7 below.

Evaluation C4
Capability of Dry Ink to be Cleaned Up

Ink compositions of Examples C1 to C30 were dropped each in an amount of 2 to 3 μg on a nozzle plate of a printing head of an ink jet printer MJ-500 (manufactured by Seiko Epson Corporation), and the ink jet printer was then dried for 24 hr. Thereafter, cleaning operation of the printer was carried out, and the state of the nozzle plate surface was observed under a microscope. The results were as given in Table 7. In the table:

⊚: The dry ink could be completely removed by single cleaning operation,

◯: Although the dry ink could not be completely removed by single cleaning operation, this had no influence on ink ejection stability, Δ: Although the dry ink could not be completely removed by repeating cleaning operation twice, this had no influence on ink ejection stability, and X: The dry ink could not be completely removed even by repeating cleaning operation thrice.

Evaluation C5
Ejection Stability

Prints were obtained in the same manner as in Evaluation C1. The prints were observed with the naked eye and under a microscope to evaluate scattering of dots (a phenomenon wherein fine ink droplets are scattered around a dot) and dropout. The results were as given in Table 7 below. In the table:

○: Neither scattering of dots nor dropout was observed by visual inspection as well as by inspection under a microscope, Δ: No droplet was observed although slight scattering of dots was observed by inspection under a microscope, and X: Scattering of dots was so significant that the printed area was seen double, and clear dropout was observed.

TABLE 7

| Evaluation test | Example C |||||||||||||||
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Evaluation C2: Rubbing resistance | ○ | ○ | ○ | ○ | ○ | ○ | ○ | ○ | ○ | ○ | ○ | ○ | ○ | ○ | ○ |
| Evaluation C3: Water resistance | ○ | ○ | ○ | ○ | ○ | ○ | ○ | ○ | ○ | ○ | ○ | ○ | ○ | ○ | ○ |
| Evaluation C4: Capability of dry ink to be cleaned-up | ⊙ | ⊙ | ○ | ○ | ○ | ○ | ○ | ○–Δ | ○–Δ | ○ | ○–Δ | ○–Δ | Δ | Δ | ○ | ⊙ |
| Evaluation C5: Ejection stability | ○ | ○ | ○ | ○ | ○ | ○ | ○ | ○ | ○ | ○ | ○ | ○ | ○ | ○ | ○ |

| Evaluation test | Example C |||||||||||||||
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Evaluation C2: Rubbing resistance | ○ | ○ | ○ | ○ | ○ | ○ | Δ | Δ | ○ | ○ | ○ | ○ | ○ | ○ | ○ |
| Evaluation C3: Water resistance | ○ | ○ | ○ | ○ | ○ | ○ | ○ | ○ | ○ | ○ | ○ | Δ | Δ | Δ | Δ |
| Evaluation C4: Capability of dry ink to be cleaned-up | ⊙ | ⊙ | ⊙ | ⊙ | ⊙ | ⊙ | ○ | ○ | ○ | ○ | ⊙ | ⊙ | ⊙ | ⊙ | ⊙ |
| Evaluation C5: Ejection stability | ○ | ○ | ○ | ○ | ○ | ○ | Δ | Δ | ○ | ○ | ○ | ○ | ○ | ○ | Δ |

Example D

Ink compositions of Examples D1 to D14, for combinations of four colors of black, cyan, magenta, and yellow, as specified in Table 8 were prepared by a conventional method. In the table, either a colorant or a dye were used.

TABLE 8

| Ingredient | | Example D |||||||||||||||
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Pigment | Carbon black | 1.5 | 1.5 | 1.5 | | | | 1.5 | 1.5 | 1.5 | 1.5 | 1.5 | 1.5 | 1.5 | 1.5 |
| | C.I. Pigment Red 122 | 1.5 | 1.5 | 1.5 | | | | 1.5 | 1.5 | 1.5 | 1.5 | 1.5 | 1.5 | 1.5 | 1.5 |
| | C.I. Pigment Blue 15 | 1.3 | 1.3 | 1.3 | | | | 1.3 | 1.3 | 1.3 | 1.3 | 1.3 | 1.3 | 1.3 | 1.3 |
| | C.I. Pigment Yellow 1 | 1.3 | 1.3 | 1.3 | | | | 1.3 | 1.3 | 1.3 | 1.3 | 1.3 | 1.3 | 1.3 | 1.3 |
| Dye | C.I. Direct Black 154 | | | | 0.5 | 0.5 | 0.5 | | | | | | | | |
| | C.I. Acid Yellow 23 | | | | 0.9 | 0.9 | 0.9 | | | | | | | | |
| | C.I. Direct Red 92 | | | | 0.8 | 0.8 | 0.8 | | | | | | | | |
| | C.I. Direct Blue 88 | | | | 0.8 | 0.8 | 0.8 | | | | | | | | |
| Thermoplastic resin | | | | | | | | | | | | | | | |
| Styrene/acrylic ester copolymer resin emulsion (MFT: 82° C.) | | 3 | 5 | 15 | 23 | 45 | | | | | | | | | |
| Styrene/methacrylic ester copolymer resin emulsion (Tg: 75° C.) | | | | | | | 15 | 5 | 10 | 5 | | 10 | 15 | 15 | 15 |
| Polyethylene emulsion (m.p.: 72° C.) | | | | | | | | | | | 18 | | | | |
| Polyethylene oxide | | | | | | | | | 10 | 6 | | | | | |
| Sodium alginate | | | | | | 0.5 | 3 | | | | | | | | |
| α-Cyclodextrin | | | | | | | | | | | 3 | | | | |
| Maltitol | | | | | | | | | | | | | 10 | 15 | |
| Sucrose | | | | | | | | | | | | 25 | | | 30 |

TABLE 8-continued

|  | Example D | | | | | | | | | | | | | |
|---|---|---|---|---|---|---|---|---|---|---|---|---|---|---|
| Ingredient | 1 | 2 | 3 | 4 | 5 | 6 | 7 | 8 | 9 | 10 | 11 | 12 | 13 | 14 |
| Nonionic surfactant: | | | | | | | | | 3 | | 1 | | | |
| Polyethylene nonylphenyl ether | | | | | | | | | | | | | | |
| Anionic surfactant: | | | | | | | | | | | | | | |
| Sodium dialkylsulfossucinate | | | 0.5 | 0.5 | 1 | | 1.5 | 0.5 | | | 0.5 | | | 0.5 |
| Ethanol | 3 | | | | | | | | | | | | | 3 |
| Propylene glycol | | 6 | 6 | | | | | | | | | | | |
| Diethylene glycol | 6 | | | | | | | 6 | 6 | | 6 | 6 | 6 | |
| Glycerin | | | | 6 | 6 | | 6 | | | | | | | 6 |
| Water-soluble polymer or saccharides/solid content of resin emulsion | | | | | | 1/30 | 3/5 | 1/1 | 6/5 | 1/6 | 5/2 | 2/3 | 1/1 | 2/1 |
| Surface tension (mN/m: 20° C.) | 42 | 40 | 40 | 42 | 30 | 46 | 33 | 38 | 35 | 43 | 33 | 36 | 48 | 35 |

Evaluation D1
Feathering in Print

Printing was carried out in the same manner as in Evaluation A1, except that ink compositions of Examples D1 to D14, for four colors of black, cyan, magenta, and yellow, were used. Feathering in the prints was evaluated in the same manner as in Example A1. The results were as given in Table 9.

TABLE 9

|  | Example D | | | | | | |
|---|---|---|---|---|---|---|---|
|  | 1 | 2 | 3 | 4 | 5 | 6 | 7 |
| Results | ○ | ⊚ | ⊚ | ⊚ | ○ | ⊚ | ⊚⊚ |

|  | Example D | | | | | | |
|---|---|---|---|---|---|---|---|
|  | 8 | 9 | 10 | 11 | 12 | 13 | 14 |
| Results | ⊚⊚ | ⊚ | ⊚ | ⊚ | ⊚⊚ | ⊚⊚ | ⊚ |

Evaluation D2
Variation in Dot Diameter and Deviation in Color

Recording papers were a) a recycled paper which, among commercially available recording papers, is likely to generally cause relatively large ink feathering and b) a copying paper which is likely to cause medium ink feathering, and c) a special paper, for ink jet recording, which is less likely to cause feathering.

I) Black ink compositions were printed alone on these papers in the same manner as in Evaluation D1. The difference in dot diameter among recording papers was evaluated according to the following criteria.

⊚: Difference of not more than 25%
○: Difference of not more than 30%
X: Difference exceeding 30%

II) Six colors in total of yellow, cyan, and magenta inks and colors formed by putting these colors on top of each other, i.e., red, green, and blue, were printed in the same manner as in Evaluation D2. The deviation in dots, i.e., deviation in color, was evaluated by visual inspection according to the following criteria.

⊚: Deviation in color was observed.
○: Deviation in color was observed in such an extent that the whole image is not deteriorated.
X: Deviation in color deteriorated the whole image.

Evaluation D3
Variation in Dot Diameter in Overlapping of Colors

Diameters of three dots, i.e., a) a diameter of a dot of a cyan ink composition printed alone on a recording paper, b) a diameter of a cyan dot formed by carrying out solid printing (100% duty) of a yellow ink composition on a recording paper, and c) a diameter of a cyan dot formed by carrying out solid printing (100% duty) of a yellow ink composition on a recording paper, carrying out solid printing a magenta ink composition thereon, and further printing a cyan ink composition thereon were compared with one another. The difference in diameter of the three dots was evaluated according to the following criteria.

⊚: Difference of not more than 25%
○: Difference of not more than 30%
X: Difference exceeding 30%

The results were as given in Table 10.

TABLE 10

|  | Example D | | | | | | | | | | | | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| Evaluation D2.I. | ○ | ⊚ | ⊚ | ⊚ | ⊚ | ⊚ | ⊚ | ⊚ | ⊚ | ⊚ | ⊚ | ⊚ | ⊚ | ⊚ |
| Evaluation D2.II. | ○ | ○ | ○ | ○ | ○ | ○ | ⊚ | ⊚ | ○ | ○ | ⊚ | ⊚ | ⊚ | ○ |
| Evaluation D3 | ○ | ⊚ | ⊚ | ⊚ | ⊚ | ⊚ | ⊚ | ⊚ | ⊚ | ⊚ | ⊚ | ⊚ | ⊚ | ⊚ |

Example E

Ink compositions of Examples E1 to E9, having compositions specified in Table 11, were prepared by a conventional method.

TABLE 11

| Ingredient | Example E | | | | | | | | |
|---|---|---|---|---|---|---|---|---|---|
|  | 1 | 2 | 3 | 4 | 5 | 6 | 7 | 8 | 9 |
| Colorant |  |  |  |  |  |  |  |  |  |
| Carbon black | 1.5 | 1.5 | 3.0 | 3.0 | 5.0 | 5.0 |  |  |  |
| C.I. Pigment Blue 15 |  |  |  |  |  |  | 3.0 |  |  |
| C.I. Pigment Red 122 |  |  |  |  |  |  |  | 3.0 |  |
| C.I. Pigment Yellow 1 |  |  |  |  |  |  |  |  | 3.0 |
| C.I. Direct Black 19 |  |  |  |  |  |  |  |  |  |
| Thermoplastic resin |  |  |  |  |  |  |  |  |  |
| Styrene/acrylic resin | 10.0 | 10.0 |  |  |  |  |  |  |  |
| Three dimensionally crosslinked styrene/acrylic resin emulsion |  |  | 15.0 | 15.0 |  |  | 15.0 | 15.0 | 15.0 |
| Acrylic resin emulsion |  |  |  |  | 10.0 |  |  |  |  |
| Vinyl acetate resin emulsion |  |  |  |  |  | 15.0 |  |  |  |
| Organic acid |  |  |  |  |  |  |  |  |  |
| L-Ascorbic acid | 0.01 |  |  |  |  | 0.005 |  |  |  |
| Sodium L-ascorbate |  | 0.1 |  |  | 0.15 |  | 0.6 |  |  |
| Erythorbic acid |  |  | 0.05 |  |  |  |  |  |  |
| Sodium erythorbate |  |  |  | 0.1 |  |  |  |  |  |
| Glycine |  |  | 0.05 |  |  |  |  | 0.3 |  |
| Disodium ethylene diaminetetraacetate |  |  |  |  |  |  |  | 0.3 |  |
| Calcium disodium ethylene diaminetetraacetate |  |  |  |  |  |  |  |  | 0.001 |
| Styrene/acrylic copolymer (dispersant) | 0.3 | 0.3 | 0.6 | 0.6 | 1.0 | 1.0 | 0.6 | 0.6 | 0.6 |
| Triethanolamine (counter ion) | 0.12 | 0.12 | 0.24 | 0.24 | 0.4 | 0.4 | 0.24 | 0.24 | 0.24 |
| Saccharose | 10.0 |  |  |  |  | 10.0 | 10.0 | 10.0 | 10.0 |
| Maltitol |  |  |  |  | 20.0 |  |  |  |  |
| Diethylene glycol | 6.0 | 6.0 |  |  |  |  | 5.0 | 5.0 | 5.0 |
| Dipropylene glycol |  |  | 6.0 | 5.0 |  |  |  |  |  |
| Glycerin |  |  |  |  | 5.0 | 5.0 |  |  |  |
| Ethanol | 1.0 |  |  | 1.0 |  |  |  |  |  |
| Ion-exchanged water | 71.07 | 81.53 | 75.06 | 75.06 | 75.06 | 58.45 | 63.595 | 65.56 | 66.159 |

Evaluation E1

Feathering in Print

Printing was carried out in the same manner as in Evaluation A1, except that ink compositions of Examples E1 to E9 were used. Feathering in the prints was evaluated in the same manner as in Example A1. The results were as given in Table 12.

TABLE 12

| | Example E | | | | | | | | |
|---|---|---|---|---|---|---|---|---|---|
| | 1 | 2 | 3 | 4 | 5 | 6 | 7 | 8 | 9 |
| Results | ⊚◯ | ◯ | ◯ | ◯ | ◯ | ⊚◯ | ⊚◯ | ◯ | ⊚◯ |

Evaluation E2

Storage Stability

Ink compositions were placed in a hermetically sealed state in an environment of 60° C. for one month. They were then evaluated for pH change, the occurrence of precipitates, and the viscosity change according to the following criteria.

pH change:

⊚: No change from the initial value observed.

◯: A change of not more than 5% from the initial value was observed.

X: A change of more than 5% from the initial value was observed. Occurrence of precipitates:

⊚: No precipitate was formed.

◯: Although precipitates were formed, it disappeared upon stirring.

X: Precipitates were formed and did not disappear even after stirring. Viscosity change:

⊚: No change from the initial value observed.

◯: A change of not more than 5% from the initial value was observed.

X: A change of more than 5% from the initial value was observed.

Evaluation E3

Rubbing Resistance and Water Resistance

The rubbing resistance and the water resistance were evaluated in the same manner as in Evaluation C2 and Evaluation C3.

The results were as given in Table 13.

TABLE 13

| Evaluation test | | Example E | | | | | | | | |
|---|---|---|---|---|---|---|---|---|---|---|
| | | 1 | 2 | 3 | 4 | 5 | 6 | 7 | 8 | 9 |
| E2 | pH change | ⊚ | ⊚ | ◯ | ◯ | ⊚ | ◯ | ⊚ | ⊚ | ◯ |
| | Precipitate | ⊚ | ⊚ | ⊚ | ⊚ | ⊚ | ◯ | ◯ | ⊚ | ⊚ |
| | Viscosity change | ⊚ | ⊚ | ⊚ | ⊚ | ◯ | ⊚ | ◯ | ◯ | ◯ |
| E3 | Water resistance | ⊚ | ⊚ | ⊚ | ⊚ | ⊚ | ⊚ | ⊚ | ◯ | ⊚ |
| | Rubbing resistance | ⊚ | ⊚ | ⊚ | ⊚ | ⊚ | ⊚ | ⊚ | ⊚ | ⊚ |

Example F

Ink compositions of Examples F1 to F6, having compositions specified in Table 14, were prepared by a conventional method.

TABLE 14

|  | Example F | | | | | |
| --- | --- | --- | --- | --- | --- | --- |
| Ingredient | 1 | 2 | 3 | 4 | 5 | 6 |
| Colorant | | | | | | |
| Carbon black | 1.5 | 1.5 | 1.5 | | | |
| C.I. Pigment Blue 15 | | | | 1.5 | | |
| C.I. Acid Yellow 23 | | | | | 1.5 | |
| C.I. Direct Red 92 | | | | | | 1.5 |
| Thermoplastic resin emulsion | | | | | | |
| Styrene/acrylic ester resin emulsion (MFT: 82° C.) | 15.0 | 15.0 | 15.0 | 15.0 | 15.0 | 15.0 |
| Maltitol | 10.0 | 10.0 | 7.0 | 7.0 | 7.0 | 7.0 |
| Sodium L-ascorbate | 0.03 | 0.03 | 0.03 | 0.03 | 0.03 | 0.03 |
| Disodium ethylene diaminetetraacetate | | 0.03 | | | | |
| Nonionic surfactant: | | | | | | |
| Acethylene glycol alcohol ethylene oxide | | 0.2 | 0.1 | 0.1 | 0.1 | |
| Anionic surfactant: | | | | | | |
| Polyoxyethylene alkylphenyl ether ammonium sulfate | 0.3 | | 0.3 | 0.3 | 0.3 | 0.3 |
| Diethylene glycol | 3.0 | 3.0 | 12.0 | 12.0 | 12.0 | 12.0 |
| Water | Balance | Balance | Balance | Balance | Balance | Balance |

Evaluation F1
Feathering in Print

Printing was carried out in the same manner as in Evaluation A1, except that ink compositions of Examples F1 to F6 were used. Feathering in the prints was evaluated in the same manner as in Example A1. The results were as given in Table 15.

TABLE 15

|  | Example F | | | | | |
| --- | --- | --- | --- | --- | --- | --- |
|  | 1 | 2 | 3 | 4 | 5 | 6 |
| Results | ⊙◯ | ⊙◯ | ⊙◯ | ⊙◯ | ⊙◯ | ⊙◯ |

Evaluation F2
Ejection Stability

Prints were obtained in the same manner as in Evaluation F1 and were evaluated in the same manner as in Evaluation C5.

Evaluation F3
Rubbing Resistance of Print

Prints were obtained in the same manner as in Evaluation F1 and were evaluated for the rubbing resistance in the same manner as in Evaluation C2.

Evaluation F4
Water Resistance of Print

Prints were obtained in the same manner as in Evaluation F1 and were evaluated for the water resistance in the same manner as in Evaluation C3.

Evaluation F5
Capability of Dry Ink to be Cleaned Up

For the ink compositions of Examples F1 to F6, the capability of dry ink to be cleaned up was evaluated in the same manner as in Evaluation C4.

Evaluation F6
Storage Stability

The ink compositions of Examples F1 to F6 were evaluated for the storage stability in the same manner as in Evaluation E2.

The results of Evaluations F2 to F6 were as given in Table 16.

TABLE 16

|  | Example F | | | | | |
| --- | --- | --- | --- | --- | --- | --- |
| Evaluation | 1 | 2 | 3 | 4 | 5 | 6 |
| F2 | ◯ | ◯ | ◯ | ◯ | ◯ | ◯ |
| F3 | ◯ | ◯ | ◯ | ◯ | ◯ | ◯ |
| F4 | ◯ | ◯ | ◯ | ◯ | ◯ | ◯ |
| F5 | ⊙ | ⊙ | ⊙ | ⊙ | ⊙ | ⊙ |
| F6 | | | | | | |
| pH change | ⊙ | ⊙ | ⊙ | ⊙ | ⊙ | ⊙ |
| Precipitate | ⊙ | ⊙ | ⊙ | ⊙ | ⊙ | ⊙ |
| Viscosity change | ⊙ | ⊙ | ⊙ | ⊙ | ⊙ | ⊙ |

We claim:

1. An ink jet recording method comprising the steps of:
    (a) providing at least one ink composition comprising a colorant, a thermoplastic resin and water, said thermoplastic resin having a temperature at which the thermoplastic resin softens when heated;
    (b) ejecting a plurality of droplets of the at least one ink composition onto the recording medium to deposit on the recording medium a plurality of ink dots that are spaced apart whereby the deposited dots have a resolution which is a reciprocal of a pitch of the dots; and
    (c) heating the recording medium with the deposited dots at the softening temperature of the thermoplastic resin or higher so as effectively to inhibit feathering of the ink composition, said heating being controlled such that the feathering, as measured by a length that an outermost portion of a deposited droplet extends from a circle of maximum size inscribable in the deposited droplet, does not exceed about 10% of a value obtained by multiplying the pitch by $1.5 \sqrt{2}/2$, said heating resulting in formation of at least a first print on the recording medium.

2. The method according to claim 1, wherein the resolution is not less than 600 dpi and, in the step of heating, the recording medium is heated so that the feathering is not more than 5 $\mu$m.

3. The method according to claim 1, wherein the ink composition comprises 5 to 40% by weight of the thermoplastic resin.

4. The method according to claim 1, wherein the thermoplastic resin is present in the form of a resin emulsion in the ink composition.

5. The method according to claim 1, wherein the ink composition further comprises a water-soluble polymer.

6. The method according to claim 5, wherein the amount of the water-soluble polymer in the ink composition is such that the water-soluble polymer to thermoplastic resin weight ratio is 1:10 to 1:1.

7. The method according to claim 1, wherein the ink composition further comprises a saccharide.

8. The method according to claim 7, wherein the amount of the saccharide in the ink composition is such that the saccharide to thermoplastic resin weight ratio is 1:5 to 1:1.

9. The method according to claim 3, wherein the ink composition further comprises a nonionic surfactant having a polyoxyethylene group.

10. The method according to claim 8, wherein the amount of the nonionic surfactant in the ink composition is 0.05 to 10% by weight based on the ink composition.

11. The method according to claim 9, wherein the ratio of a solid content of the resin emulsion to the saccharide in the ink composition is 3:1 to 1:1.

12. The method according to claim 3, wherein the ink composition further comprises an anionic surfactant having a polyoxyethylene group.

13. The method according to claim 12, wherein the ratio of a solid content of the resin emulsion to the anionic surfactant in the ink composition is 1000:1 to 2:1.

14. The method according to claim 3, wherein the ink composition further comprises an organic acid.

15. The method according to claim 14, wherein the organic acid is an amino acid, its salt, or its derivative.

16. The method according to claim 15, wherein the amount of the amino acid, its salt, or its derivative in the ink composition is 0.01 to 0.5% by weight based on the ink composition.

17. The method according to claim 1, wherein the recording medium comprises means for fixation of an ink composition.

18. The method according to claim 1, wherein the recording medium has fibers into which the ink composition penetrates to form an ink dot.

19. The method according to claim 18, wherein the recording medium is a recording paper.

20. The method according to claim 1 comprising providing a second ink composition comprising a second colorant, a second thermoplastic resin and water, and ejecting a plurality of droplets of the second ink composition onto or adjacent the first print after step (c), the heating in step (c) being controlled such that the ejection of the second ink composition forms a second print that does not bleed with the first print.

21. The method according to claim 1, wherein said heating in step (c) is controlled such that the feathering does not exceed about 10% of a value obtained by multiplying the pitch by $\sqrt{2}/2$.

* * * * *